(12) United States Patent
Doi et al.

(10) Patent No.: US 9,707,742 B2
(45) Date of Patent: Jul. 18, 2017

(54) FLAME-RESISTANT COMPOSITE MEMBER

(71) Applicant: NITTO DENKO CORPORATION, Osaka (JP)

(72) Inventors: Kohei Doi, Ibaraki (JP); Kunio Nagasaki, Ibaraki (JP); Yusuke Sugino, Ibaraki (JP); Takafumi Hida, Ibaraki (JP); Yusuke Nakayama, Ibaraki (JP); Keisuke Hirano, Ibaraki (JP)

(73) Assignee: NITTO DENKO CORPORATION, Osaka (JP)

( * ) Notice: Subject to any disclaimer, the term of this patent is extended or adjusted under 35 U.S.C. 154(b) by 490 days.

(21) Appl. No.: 14/357,906

(22) PCT Filed: Nov. 13, 2012

(86) PCT No.: PCT/JP2012/079346
§ 371 (c)(1),
(2) Date: May 13, 2014

(87) PCT Pub. No.: WO2013/073517
PCT Pub. Date: May 23, 2013

(65) Prior Publication Data
US 2014/0301090 A1    Oct. 9, 2014

(30) Foreign Application Priority Data

Nov. 14, 2011 (JP) .................................. 2011-249151
Apr. 11, 2012 (JP) .................................. 2012-090573
Nov. 12, 2012 (JP) .................................. 2012-248258

(51) Int. Cl.
*B32B 27/08* (2006.01)
*B32B 27/28* (2006.01)
(Continued)

(52) U.S. Cl.
CPC ............ *B32B 27/08* (2013.01); *B32B 27/283* (2013.01); *C08J 7/047* (2013.01); *C09D 183/04* (2013.01);
(Continued)

(58) Field of Classification Search
CPC ..... B32B 27/08; B32B 27/283; C09D 183/04; C08J 7/047; C08J 2483/04; C08J 2483/06;
(Continued)

(56) References Cited

U.S. PATENT DOCUMENTS 4,410,594 A    10/1983    Olson
4,615,947 A    10/1986    Goossens
(Continued)

FOREIGN PATENT DOCUMENTS

CN    101652245    2/2010
EP    2202275    6/2010
(Continued)

OTHER PUBLICATIONS

Office Action issued in Japan Counterpart Patent Appl. No. 2012-248258, dated Apr. 12, 2016 , along with an English translation thereof.
(Continued)

*Primary Examiner* — Stephen F Husar
(74) *Attorney, Agent, or Firm* — Greenblum & Bernstein, P.L.C.

(57) ABSTRACT

There is provided a flame-resistant composite member exhibiting remarkably high flame resistance even if having a flammable base material. The flame-resistant composite member according to the present invention has a film formed of a silicone resin composition (C) containing at least an inorganic oxide particle-containing condensation-reactive silicone resin on at least one surface of a base material. The
(Continued)

inorganic oxide particle-containing condensation-reactive silicone resin may be a condensation-reactive silicone resin (A) including a crosslinked structural body wherein an inorganic oxide particle dispersed in a polysiloxane resin having a condensation-reactive group and the polysiloxane resin are crosslinked through a chemical bond. The silicone resin composition (C) may contain the condensation-reactive silicone resin (A) and an inorganic particle (B).

19 Claims, 1 Drawing Sheet

(51) Int. Cl.
*F21V 25/12* (2006.01)
*C08J 7/04* (2006.01)
*C09D 183/04* (2006.01)
*C08G 77/18* (2006.01)

(52) U.S. Cl.
CPC ............ *F21V 25/12* (2013.01); *C08G 77/18* (2013.01); *C08J 2483/04* (2013.01); *C08J 2483/06* (2013.01); *Y10T 428/252* (2015.01); *Y10T 428/269* (2015.01); *Y10T 428/31507* (2015.04); *Y10T 428/31663* (2015.04)

(58) Field of Classification Search
CPC . F21V 25/12; C08G 77/18; Y10T 428/31663; Y10T 428/31507; Y10T 428/269; Y10T 428/252; C08K 3/36
See application file for complete search history.

(56) References Cited

U.S. PATENT DOCUMENTS

| | | | |
|---|---|---|---|
| 5,552,466 A | 9/1996 | Beckley et al. | |
| 2004/0166332 A1 | 8/2004 | Zhu et al. | |
| 2005/0234167 A1 | 10/2005 | Bae et al. | |
| 2007/0122631 A1 | 5/2007 | Higuchi et al. | |
| 2009/0042042 A1 | 2/2009 | Yuki et al. | |
| 2010/0085751 A1* | 4/2010 | Shaner | F21K 9/00 362/249.02 |
| 2010/0093242 A1 | 4/2010 | Katsoulis et al. | |
| 2010/0104877 A1 | 4/2010 | Zhu et al. | |
| 2010/0160577 A1 | 6/2010 | Hirano | |
| 2010/0304152 A1 | 12/2010 | Clarke | |
| 2011/0079929 A1 | 4/2011 | Matsuda et al. | |
| 2011/0223421 A1 | 9/2011 | Harimoto et al. | |
| 2012/0045650 A1 | 2/2012 | Iwazumi | |

FOREIGN PATENT DOCUMENTS

| | | |
|---|---|---|
| JP | 1-170668 | 7/1989 |
| JP | 01-223141 | 9/1989 |
| JP | 7-186333 | 7/1995 |
| JP | 2001-506283 | 5/2001 |
| JP | 2003-246928 | 9/2003 |
| JP | 2004-256632 | 9/2004 |
| JP | 2006-131734 | 5/2006 |
| JP | 2006-198466 | 8/2006 |
| JP | 2006-518798 | 8/2006 |
| JP | 2006-272660 | 10/2006 |
| JP | 2007-246880 | 9/2007 |
| JP | 2009-107507 | 5/2009 |
| JP | 4332578 | 9/2009 |
| JP | 2009-221435 | 10/2009 |
| JP | 4529046 | 5/2010 |
| JP | 4491778 | 6/2010 |
| JP | 2010-522649 | 7/2010 |
| JP | 4539349 | 9/2010 |
| JP | 2010-270339 | 12/2010 |
| JP | 2011-082339 A | 4/2011 |
| JP | 2011-500938 | 6/2011 |
| WO | 2005/047200 A1 | 5/2005 |
| WO | 2010/059710 | 5/2010 |
| WO | 2012/024387 | 2/2012 |

OTHER PUBLICATIONS

Japanese communication issued with respect to application No. 2012-248258, mail date is Jul. 12, 2016.

Search report from E.P.O. for Application No. 12850042.8, mail date is Jul. 8, 2015.

China Office action for Application No. 201280055719.4, dated Jun. 9, 2015; along with an English translation thereof.

International Search Report for PCT/JP2012/079346, which was mailed on Jan. 22, 2013; along with an English translation thereof.

* cited by examiner

FLAME-RESISTANT COMPOSITE MEMBER

TECHNICAL FIELD

The present invention relates to a flame-resistant composite member, more particularly to a flame-resistant composite member obtained by forming as a film a silicone resin composition containing at least an inorganic oxide particle-containing condensation-reactive silicone resin on a base material, and an illumination apparatus using the flame-resistant composite member.

BACKGROUND ART

Halogen-based flame resistants are conventionally broadly used as flame resistants to make coating compositions flame-resistant (see, for example, Patent Literature 1). However, this method, since having the problem of dioxins and flons generated from halogenated flame-resistants, cannot be said to be preferable on the environmental protection. Inorganic flame resistants such as aluminum hydroxide are also used as flame resistants to make coating compositions flame-resistant. However, aluminum hydroxide has the problem of decreasing physical properties, including the water resistance, of coating materials and base materials to which the coating materials have been applied.

There is also a method of coating plastics with inorganic coating materials for flame resistance. However, the inorganic coating materials are less flexible and liable to crack, and thus coating therewith as thick films is difficult. Therefore, though the coating materials have flame resistance, in the case of composites with plastics, heat by flame contact is transferred to plastics, which resultantly carbonize or spread fire. In the case of coating materials containing an organic binder, the organic binder carbonizes in flame contact. Therefore, plastics which have been coated with these coating materials are difficult to use for applications requiring non-carbonization such as applications to railway rolling stock.

Glass fiber sheets on which an inorganic coating agent has been applied are conventionally known as railway rolling stock illumination covers. However, glass fiber sheets which have been coated with a common inorganic coating agent or which are impregnated with the inorganic coating agent, in the case where the binder contains an organic component, have the problem of low nonflammability; and those, in the case where the binder is an inorganic component, have drawbacks of low flexibility and easy cracking.

Patent Literature 2 discloses a light diffusion sheet including at least one sheet of a glass fiber woven cloth and a pair of resin layers interposing the glass fiber woven cloth, wherein the resin layers are constituted of a thermosetting resin or photocurable resin such as a vinyl ester. Patent Literature 3 discloses a glass fiber sheet having at least one sheet of a glass fiber woven cloth, resin-coated layers composed of a thermosetting resin formed by being impregnated and solidified in the glass fiber woven cloth, and a bead layer on at least one surface of the resin-coated layers. However, either of these light diffusion sheets exhibits insufficient nonflammability and low flexibility.

CITATION LIST

Patent Literature

Patent Literature 1
  Japanese Patent Laid-Open No. 7-186333
Patent Literature 2
  Japanese Patent No. 4491778
Patent Literature 3
  Japanese Patent No. 4539349

SUMMARY OF INVENTION

Technical Problem

It is an object of the present invention to provide a flame-resistant composite member exhibiting remarkably high flame resistance even if having a flammable base material, and an illumination apparatus using the flame-resistant composite member.

Solution to Problem

As a result of exhaustive studies to achieve the above-mentioned object, the present inventors have found that if a silicone resin composition containing an inorganic oxide particle-containing condensation-reactive silicone resin is applied to a base material and formed as a film thereon, a composite member having remarkably high flame resistance can be provided, and this finding has led to the completion of the present invention.

That is, the present invention provides a flame-resistant composite member having a film formed of a silicone resin composition (C) containing at least an inorganic oxide particle-containing condensation-reactive silicone resin on at least one surface of a base material.

As the inorganic oxide particle-containing condensation-reactive silicone resin, there can be used a condensation-reactive silicone resin (A) comprising a crosslinked structural body wherein an inorganic oxide particle dispersed in a polysiloxane resin having a condensation-reactive group and the polysiloxane resin are crosslinked through a chemical bond.

In the condensation-reactive silicone resin (A), as the polysiloxane resin having a condensation-reactive group, there may be used (i) a condensation-reactive group-containing polysilsesquioxane wherein a basic structural unit thereof is a T unit, or (ii) the condensation-reactive group-containing polysilsesquioxane wherein a basic structural unit thereof is a T unit and also a condensation-reactive group-containing polysiloxane wherein basic structural units thereof are a D unit and a T unit and/or a polysiloxane resin having a silanol group.

In the flame-resistant composite member, the silicone resin composition (C) containing at least the inorganic oxide particle-containing condensation-reactive silicone resin may contain: a condensation-reactive silicone resin (A) comprising a crosslinked structural body wherein an inorganic oxide particle dispersed in a polysiloxane resin having a condensation-reactive group and the polysiloxane resin are crosslinked through a chemical bond; and an inorganic particle (B).

The inorganic particle (B) may be at least one inorganic particle selected from the group consisting of glass frits, silica particles, alumina particles, aluminum hydroxide particles, magnesium hydroxide particles, tin oxide particles and clay mineral particles.

The deformation point of the glass frit as the inorganic particle (B) may be not less than 300° C. and not more than 700° C.

The glass frit as the inorganic particle (B) may be a glass frit formed of at least one component selected from silicic acid, boric acid, borosilicic acid, aluminum oxide, calcium oxide, sodium oxide, lithium oxide and phosphorus oxide. The glass frit as the inorganic particle (B) is especially preferably a glass frit formed of at least a component containing phosphorus oxide. The average, particle diameter of the glass frit as the inorganic particle (B) is, for example, 0.1 μm to 1,000 μm.

The content of the inorganic particle (B) is, for example, 0.1 to 500 parts by weight with respect to 100 parts by weight of a condensation-reactive silicone resin (A).

The base material may be a sheet-like or plate-like plastic-based base material.

The thickness of a flame-resistant composite member is, for example, 50 to 6,000 μm.

The thickness of a film formed of the silicone resin composition (C) is, for example, 5 to 1,000 μm.

The flame-resistant composite member preferably has a property of not igniting or carbonizing in the combustion test of the railway rolling stock material combustion test.

The flame-resistant composite member preferably has the nonflammability in the combustion test of the railway rolling stock material combustion test.

The flame-resistant composite member, in the cone calorimeter test of the railway rolling stock material combustion test, preferably further has a total amount of heat generated per 10 min of not more than 30 MJ/m$^2$, a maximum heat generation rate of not more than 300 kW/m$^2$, and an ignition time of not less than 60 sec.

The flame-resistant composite member is used, for example, as transport machinery interior members, building material members, display members, household appliance members or electronic circuit members. The transport machinery interior members include, for example, illumination covers.

The present invention also provides an illumination apparatus using the flame-resistant composite member, the illumination apparatus having, at least, a light source to generate light used for illumination, and an illumination cover installed so as to cover the light source and having the flame-resistant composite member, wherein light from the light source is transmitted through the flame-resistant composite member and emitted.

Advantageous Effects of Invention

The flame-resistant composite member according to the present invention, since having a film formed of a silicone resin composition containing an inorganic oxide particle-containing condensation-reactive silicone resin on a base material, is very excellent in flame resistance, and even if the base material is flammable, does not spread fire in flame contact, and preferably does not ignite or carbonize. The flame-resistant composite member having a film formed of a silicone resin composition containing a specific condensation-reactive silicone resin and an inorganic particle on a base material is more improved in the strength of the film, exhibits remarkably high flame resistance, and even if the thickness of the base material is relatively thin, does not spread fire in flame contact and further does not ignite or carbonize. Therefore, the flame-resistant composite member according to the present invention is useful particularly as interior members of transport machinery such as railway rolling stock, air carriers, automobiles, ships, elevators and escalators, building material members, display members, household appliance members and electronic circuit members. The flame-resistant composite member can suitably be utilized particularly as illumination covers of illumination apparatuses.

DESCRIPTION OF EMBODIMENTS

The flame-resistant composite member according to the present invention has a film (an inorganic oxide particle-containing silicone resin film) formed of a silicone resin composition (C) containing at least an inorganic oxide particle-containing condensation-reactive silicone resin on at least one surface of a base material.

Figure 1:
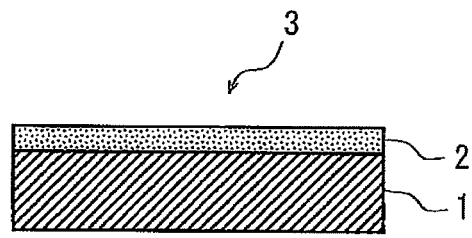
FIG. 1 is a schematic cross-sectional diagram showing one example of the flame-resistant composite member according to the present invention.

FIG. 1 is a schematic cross-sectional diagram showing one example of the flame-resistant composite member according to the present invention. In this example, the flame-resistant composite member 3 has a film (coated layer) 2 formed of an inorganic oxide particle-containing condensation-reactive silicone resin on one surface of a base material 1. Here, the film may be formed on both surfaces of the base material 1.

[Base Material]

A base material is not especially limited as long as being capable of becoming an object to be imparted with or improved in the flame resistance, but is preferably sheet-like or plate-like. Here, a layer material composed of a pressure-sensitive adhesive agent is not included in the base material in the present invention.

Base materials usable are suitable thin sheet bodies, for example, plastic-based base materials such as plastic sheets and plates; rubber-based base materials such as rubber sheets; foamed bodies such as foamed sheets; paper-based base materials such as paper; fiber-based base materials (excluding glass fiber base materials) such as cloths, nonwoven fabrics and nets; and laminated bodies thereof [for example, laminated bodies of a plastic-based base material and another base material and a laminated body of plastic sheets or plastic plates].

In the present invention, plastic-based base materials such as plastic sheets and plates (including laminated bodies containing at least a plastic-based base material) can suitably be used. Materials for such plastic sheets or the like include thermoplastic resins and thermosetting resins. Examples of the thermoplastic resins include olefin-based resins using α-olefins as monomers such as polyethylene (PE), polypropylene (PP), ethylene-propylene copolymers and ethylene-vinyl acetate copolymers (EVA); polyester-based resins such as polycarbonate (PC), polyethylene terephthalate (PET), polyethylene naphthalate (PEN) and polybutylene terephthalate (PET); polyvinyl chlorides (PVC); vinyl acetate-based resins; styrene-based resins such as polystyrenes, ABS resins and AS resins; acryl resins; polyacrylonitriles; polyphenylene sulfides (PPS); amide-based resins such as polyamides (nylons) and whole aromatic polyamides (aramids); polyimides (PI); polyamidoimides (PAI);

polyether ether ketones (PEEK); polyarylates (PAR); polysulfones (PSF); polyether sulfones (PES); fluororesins such as polytetrafluoroethylenes (PTFE); cyclic polyolefins; polyacetals (POM); and polyphenylene ethers (including modified polyphenylene ethers). Examples of the thermosetting resins include epoxy resins, phenol resins, melamine resins, urea resins, unsaturated polyester resins, and alkyd resins. These materials can be used singly or in combinations of not less than two.

Among the above, as materials for plastic-based base materials, from the viewpoint of being especially excellent in the flame resistance, preferable are olefin-based resins such as polyethylenes and polypropylenes; and polycarbonate resins. Among the above, especially preferable is polycarbonate resins.

As plastic-based materials, from the viewpoint of being especially excellent in the flame resistance, plastics having been subjected to a flame-resistant treatment may preferably be used. The flame-resistant treatment method is not especially limited, but includes the addition of an organic flame resistant or an inorganic flame resistant, and the addition of a glass fiber or a filler to improve the plastic strength. The organic flame resistant includes fluorine-based compounds, chlorine-based compounds, bromine-based compounds, phosphorus-based compounds, silicone-based compounds, sulfur-based flame resistants, and the inorganic flame resistant includes metal hydroxides such as aluminum hydroxide and magnesium hydroxide, boron-based compounds, phosphorus-based compounds, antimony-based compounds, and sulfur-based flame resistants.

In the case of using a plastic-based base material as a base material, out of both surfaces of the plastic-based base material, one surface thereof on the side to form an inorganic oxide particle-containing silicone resin film on is preferably subjected to no peeling treatment from the viewpoint of the adherence.

The thickness of a base material can suitably be selected according to applications and the like, but the upper limit is usually 5,000 μm, preferably 4,000 μm, and still more preferably 3,000 μm: and the lower limit is, for example, 45 μm, preferably 80 μm, still more preferably 100 μm, and especially preferably 150 μm.

In order to improve the adherence of a base material with a film formed of the silicone resin composition (C), there may further be provided a primer layer directly contacting with both of the film formed of the silicone resin composition (C), and the base material.

A compound used for forming the primer layer suffices if being a component (including a component to develop the adhesivity by curing or reaction) having the adhesivity with both of the film formed of the silicone resin composition (C), and the base material; examples thereof include silane-based coupling agents (including partially hydrolytic condensates) and (meth)acryloyl group-containing organic compounds, and are not especially limited; but silane-based coupling agents are preferable from the viewpoint that the surface hardly carbonizes in combustion. Examples of the silane-based coupling agent include ones having a reactive functional group such as an amino group, a vinyl group, an epoxy group, a mercapto group, a chlorine group or a (meth) acryloyl group, and a hydrolyzable alkoxysilyl group in the same molecule, and are not especially limited; but amino group-containing silane coupling agents are preferable from the viewpoint of the anchoring property with a base material.

Specific examples of the amino group-containing silane coupling agents include 3-aminopropyltrimethoxysilane, 3-aminopropyltriethoxysilane, 3-dimethylaminopropy(triethoxy)silane, 3-dimethylaminopropyl(trimethoxy)silane, 3-diethylaminopropyl(triethoxy)silane, 3-diethylaminopropyl(trimethoxy)silane, 2-dimethylaminoethyl(triethoxy)silane, 2-dimethylaminoethyl(trimethoxy)silane, 3-dimethylaminopropyl(diethoxy)methylsilane, 3-dibutylaminopropyl(triethoxy)silane, aminophenyltrimethoxysilane, aminophenyltriethoxysilane, 3-(N-methylamino)propyltrimethoxysilane and 3-(N-methylamino)propyltriethoxysilane, and are not especially limited; but 3-aminopropyltrimethoxysilane and 3-aminopropyltriethoxysilane are preferable from the viewpoint of the availability.

A primer treatment can be carried out by applying a composition containing the above-mentioned compound (adhesive component) on the base material surface by using a method such as coating, dip coating or spray coating. The incorporation of a solvent to dissolve a base material in the composition roughens the base material surface and can exhibit the anchoring effect.

On at least one surface of a base material, there may be provided, in addition to the above-mentioned primer layer (easily adhesive layer), a light diffusion layer, an antireflection layer, an ultraviolet absorption layer, a heat barrier layer, a heat insulation layer and the like, in the range of not impairing the flame resistance.

[Inorganic Oxide Particle-Containing Condensation-Reactive Silicone Resin]

A "condensation-reactive silicone resin" of an "inorganic oxide particle-containing condensation-reactive silicone resin" in the present invention is not especially limited as long as being a silicone resin (polysiloxane resin) having a condensation-reactive group; and examples thereof include condensation-reactive group-containing polysiloxanes wherein basic structural units thereof are a D unit and a T unit (hereinafter, referred to as "D-T unit condensation-reactive group-containing polysiloxane" in some cases), condensation-reactive group-containing polysilsesquioxanes wherein a basic structural unit thereof is a T unit (hereinafter, referred to as "condensation-reactive group-containing polysilsesquioxane" in some cases), and condensation-reactive group-containing polysiloxanes wherein basic structural units thereof are an M unit and a Q unit. These may be used singly or in combinations of not less than two.

Among the condensation-reactive silicone resins, from the viewpoint of being capable of imparting the flexibility to a composite member, preferable are a D-T unit condensation-reactive group-containing polysiloxane, a condensation-reactive group-containing polysilsesquioxane, and a combination of a D-T unit condensation-reactive group-containing polysiloxane and a condensation-reactive group-containing polysilsesquioxane. In the present invention, especially preferable is a condensation-reactive group-containing polysilsesquioxane, or a combination of a D-T unit condensation-reactive group-containing polysiloxane and a condensation-reactive group-containing polysilsesquioxane.

The condensation-reactive group includes silanol groups, alkoxysilyl groups (for example, $C_{1-6}$ alkoxysilyl groups), cycloalkyloxysilyl groups (for example, $C_{3-6}$ cycloalkyloxysilyl groups), and aryloxysilyl groups (for example, $C_{6-10}$ aryloxysilyl groups). Among these, preferable are silanol groups, alkoxysilyl groups, cycloalkyloxysilyl groups, and aryloxysilylgroups, and especially preferable are silanol groups and alkoxysilyl groups.

A D-T unit condensation-reactive group-containing polysiloxane specifically contains as basic structural units a D unit represented by the following formula (1) and a T unit represented by the following formula (2).

[Formula 1]

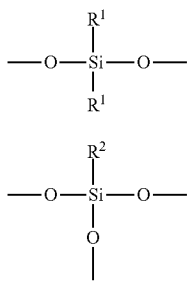

(1)

(2)

In the above formula (1), $R^1$ are identical or different, and each represent a monovalent hydrocarbon group selected from saturated hydrocarbon groups and aromatic hydrocarbon groups. In the formula (2), $R^2$ represents a monovalent hydrocarbon group selected from saturated hydrocarbon groups and aromatic hydrocarbon groups.

Examples of the saturated hydrocarbon group in the above $R^1$ and $R^2$ include straight-chain or branched-chain alkyl groups having 1 to 6 carbon atoms such as a methyl, ethyl, propyl, isopropyl, butyl, isobutyl, pentyl and hexyl groups; and cycloalkyl groups having 3 to 6 carbon atoms such as a cyclopentyl and cyclohexyl groups. Examples of the aromatic hydrocarbon group in the above $R^1$ and $R^2$ include aryl groups having 6 to 10 carbon atoms such as a phenyl and naphthyl groups.

$R^1$ and $R^2$ are preferably each an alkyl group having 1 to 6 carbon atoms or an aryl group having 6 to 10 carbon atoms, and more preferably a methyl group.

D units represented by the formula (1) may be identical or different in a D-T unit condensation-reactive group-containing polysiloxane, but are preferably identical. T units represented by the formula (2) may be identical or different in a D-T unit condensation-reactive group-containing polysiloxane, but are preferably identical.

A D-T unit condensation-reactive group-containing polysiloxane is a partial condensate of corresponding silicone monomers [for example, a partial condensate of a bifunctional silicone monomer such as a dialkyl(or aryl)dialkoxysilane, and a trifunctional silicone monomer such as an alkyl(or aryl)trialkoxysilane], and contains a D unit, a T unit and a group represented by the following formula (3):

—$OR^3$ (3)

in the constituting units. The group represented by the formula (3) bonds to a silicon atom, and is present at the molecular terminal.

The above $R^3$ represents a monovalent hydrocarbon group selected from saturated hydrocarbon groups and aromatic hydrocarbon groups. The saturated hydrocarbon group or the aromatic hydrocarbon group includes the same as the saturated hydrocarbon group or the aromatic hydrocarbon group in $R^1$ in the above formula (1). $R^3$ is preferably a saturated hydrocarbon group, more preferably an alkyl group having 1 to 6 carbon atoms, and especially preferably a methyl group or an ethyl group.

Examples of such a D-T unit condensation-reactive group-containing polysiloxane include alkoxysilyl group- (for example, $C_{1-6}$ alkoxysilyl group-)containing polymethylsiloxanes, alkoxysilyl group- (for example, $C_{1-6}$ alkoxysilyl group-)containing polymethylphenylsiloxanes, alkoxysilyl group- (for example, $C_{1-6}$ alkoxysilyl group-)containing polyphenylsiloxanes. These D-T unit alkoxysilyl group-containing polysiloxanes may be used singly or in combinations of not less than two.

Among the D-T unit condensation-reactive group-containing polysiloxane, preferable are $C_{1-6}$ alkoxysilyl group-containing polysiloxanes; more preferable are methoxysilyl group-containing polysiloxanes or ethoxysilyl group-containing polysiloxanes; and especially preferable are methoxysilyl group-containing polymethylsiloxanes or ethoxysilyl group-containing polymethylsiloxanes.

With respect to the content of a condensation-reactive group (for example, an alkoxysilyl group) of such a D-T unit condensation-reactive group-containing polysiloxane, the upper limit is, for example, 30 wt %, and preferably 25 wt %; and the lower limit is, for example, 8 wt %, preferably 10 wt %, and more preferably 12 wt %. The content of the condensation-reactive group (for example, an alkoxysilyl group) can be determined from a proportion of a weight loss in TGA (using a differential weight loss measurement instrument) of the polysiloxane when the polysiloxane is heated from room temperature to 300° C.

With respect to the number-average molecular weight (in terms of standard polystyrene by GPC measurement) of a D-T unit condensation-reactive group-containing polysiloxane, the upper limit is, for example, 6,000, preferably 5,500, and more preferably 5,300; and the lower limit is, for example, 800, preferably 1,000, and more preferably 1,200.

As a D-T unit condensation-reactive group-containing polysiloxane, there can also be used commercially available products (D-T unit alkoxysilyl group-containing polysiloxanes) such as "X-40-9246" and "X-40-9250" by trade names (the above-mentioned are made by Shin-Etsu Chemical Co., Ltd.).

The condensation-reactive group-containing polysilsesquioxane specifically contains a T unit represented by the above formula (2) as a basic structural unit. The T units represented by the formula (2) may be identical or different in the condensation-reactive group-containing polysilsesquioxane, but are preferably identical.

A condensation-reactive group-containing polysilsesquioxane is a partial condensate of a corresponding silicone monomer [for example, a partial condensate of a trifunctional silicone monomer such as an alkyl(or aryl)trialkoxysilane], and contains a T unit and a group represented by the following formula (4):

—$OR^4$ (4)

in the constituting units. The group represented by the formula (4) bonds to a silicon atom, and is present at the molecular terminal.

The $R^4$ represents a monovalent hydrocarbon group selected from saturated hydrocarbon groups and aromatic hydrocarbon groups. The saturated hydrocarbon group or the aromatic hydrocarbon group includes the same as the saturated hydrocarbon group or the aromatic hydrocarbon group in $R^1$ in the above formula (1). $R^4$ is preferably a saturated hydrocarbon group, more preferably an alkyl group having 1 to 6 carbon atoms, and especially preferably a methyl group or an ethyl group.

A condensation-reactive group-containing polysilsesquioxane may be of any of random type, ladder type, cage type and the like, but is most preferably of random type from the viewpoint of the flexibility. These condensation-reactive group-containing polysilsesquioxanes may be used singly or in combinations of not less than two.

Among the condensation-reactive group-containing polysilsesquioxanes, preferable are $C_{1-6}$ alkoxysilyl group-containing polysilsesquioxanes; more preferable are methoxysilyl group-containing polysilsesquioxanes or ethoxysilyl group-containing polysilsesquioxanes; and especially preferable are methoxysilyl group-containing polymethylsilsesquioxanes or ethoxysilyl group-containing polymethylsilsesquioxanes.

With respect to the content of the condensation-reactive group (for example, an alkoxysilyl group) of such a condensation-reactive group-containing polysilsesquioxane, the upper limit is, for example, 50 wt %, preferably 48 wt %, and more preferably 46 wt %; and the lower limit is, for example, 10 wt %, preferably 15 wt %, and more preferably 20 wt %. The content of the condensation-reactive group (for example, an alkoxysilyl group) can be determined from a proportion of a weight loss in TGA (using a differential weight loss measurement instrument) of the polysilsesquioxane when the polysilsesquioxane is heated from room temperature to 300° C.

With respect to the number-average molecular weight (in terms of polystyrene by GPC measurement) of a condensation-reactive group-containing polysilsesquioxane, the upper limit is, for example, 6,000, preferably 3,500, and more preferably 3,000; and the lower limit is, for example, 200, preferably 300, and more preferably 400.

As a condensation-reactive group-containing polysilsesquioxane, there can also be used commercially available products (alkoxysilyl group-containing polysilsesquioxanes) such as "KC-89", "KR-500" and "X-40-9225" by trade names (the above-mentioned are made by Shin-Etsu Chemical Co., Ltd.).

Additionally, there can also be used commercially available products as polysiloxane compounds having a reactive silanol group in the molecule (molecular terminal), such as "X-21-3153" and "X-21-5841" by trade names (the above-mentioned are made by Shin-Etsu Chemical Co., Ltd.).

The proportion of the total amount of a D-T unit condensation-reactive group-containing polysiloxane and a condensation-reactive group-containing polysilsesquioxane in the whole of the polysiloxane compound is preferably not less than 50 wt %, more preferably not less than 70 wt %, and especially preferably not less than 90 wt %.

In the present invention, the polysiloxane resin is a polysiloxane resin having an alkoxysilyl group and/or a silanol group in the molecule (molecular terminal), and having a total content of these groups (the alkoxysilyl group and the silanol group) of 8 to 48 wt %; and the polysiloxane resin is preferably crosslinked with the inorganic oxide particle through a chemical bond. The upper limit of the total content of the alkoxysilyl group and the silanol group is more preferably 30 wt %; and the lower limit is more preferably 10 wt %.

In the present invention, as a condensation-reactive silicone resin, it is preferable particularly from the viewpoint of the flexibility, the strength, the nonflammability and the like that a condensation-reactive group-containing polysilsesquioxane is used, or a D-T unit condensation-reactive group-containing polysiloxane and a condensation-reactive group-containing polysilsesquioxane are concurrently used. In this case, with respect to the proportion (weight ratio) of the D-T unit condensation-reactive group-containing polysiloxane to the condensation-reactive group-containing polysilsesquioxane, the upper limit is, for example, 4.9, preferably 3, and more preferably 2; and the lower limit is, for example, 0, and preferably 0.02; but in the case of further imparting the flexibility, the upper limit is, for example, 100. If the ratio of a D-T unit condensation-reactive group-containing polysiloxane is too high, since the organic group content increases, there arise some cases where the silicone resin is liable to ignite and spread fire.

In the present invention, as the inorganic oxide particle-containing condensation-reactive silicone resin, it is preferable from the viewpoint of the heat resistance and the strength that a crosslinked structural body is used in which a condensation-reactive silicone resin is crosslinked with an inorganic oxide particle through a chemical bond. There is preferably used, for example, a condensation-reactive silicone resin (A) comprising a crosslinked structural body wherein an inorganic oxide particle dispersed in a polysiloxane resin having a condensation-reactive group and the polysiloxane resin are crosslinked through a chemical bond. Hereinafter, the condensation-reactive silicone resin (A) will be described.

As a polysiloxane resin having a condensation-reactive group, the above-mentioned ones can be used. Among those, preferable is a condensation-reactive group-containing polysilsesquioxane, or a combination of a D-T unit condensation-reactive group-containing polysiloxane and a condensation-reactive group-containing polysilsesquioxane.

As the inorganic oxide particle, an inorganic oxide particle suffices if having a reactive functional group on the particle surface, and examples thereof include silica ($SiO_2$ or $SiO$), alumina ($Al_2O_3$), glass frits, antimony-doped tin oxide (ATO), titanium oxide (titania, $TiO_2$), and zirconia ($ZrO_2$). The inorganic oxide particle may be a composite inorganic oxide particle composed of not less than two inorganic oxides. Among these, silica is especially preferable. The inorganic oxide particle may be used singly or in combinations of not less than two.

Examples of the reactive functional group include a hydroxyl group, an isocyanate group, a carboxyl group, an epoxy group, an amino group, a mercapto group, a vinyl-type unsaturated group, a halogen atom, and an isocyanurate group. Among these, a hydroxyl group is preferable. The hydroxyl group on the silica particle surface is present as a silanol group.

With respect to the average particle diameter (primary particle diameter) of an inorganic oxide particle, the upper limit is, for example, 500 µm, preferably 100 µm, more preferably 10 µm, and especially preferably 1 µm; and the lower limit is, for example, 1 nm. Here, the average particle diameter can be measured by a dynamic light scattering method or the like.

The size distribution of an inorganic oxide particle is desirably narrower, and the inorganic oxide particle is also desirably in a monodisperse state of being dispersed while being in the state of the primary particle diameter. Further the surface potential of an inorganic oxide particle is preferably in an acidic range (for example, pH 2 to 5, preferably pH 2 to 4). The surface potential suffices if being such a surface potential in the reaction with a polysiloxane resin.

As the inorganic oxide particle, the inorganic oxide particle in a colloidal state is preferably used. Examples of the colloidal inorganic oxide particle include colloidal silica, colloidal alumina (alumina sol), and colloidal tin oxide (tin oxide water dispersion).

Examples of colloidal silica include colloids of microparticles (average particle diameter is, for example, 5 to 1,000 nm, and preferably 10 to 100 nm) of silicon dioxide (anhydrous silicic acid) as described in Japanese Patent Laid-Open No. 53-112732 and Japanese Patent Publication Nos. 57-9051 and 57-51653, and the like.

The colloidal silica, as required, can contain, for example, alumina and sodium aluminate, and as required, also can contain a stabilizer such as an inorganic base (for example, sodium hydroxide, potassium hydroxide, lithium hydroxide or ammonia) and an organic base (for example, a tetramethylammonium).

Such a colloidal silica is not especially limited, and can be produced by a well-known sol-gel method, specifically for example, a sol-gel method described in Werner Stober et al, J. Colloid and Interface Sci., 26, 62-69 (1968), Rickey D. Badley et al, Langmuir 6, 792-801 (1990), Journal of Japan Society of Color Material, 61 [9] 488-493 (1988), or the like.

The colloidal silica is preferably in a bare state of being subjected to no surface treatment. The colloidal silica has a silanol group present as a surface functional group.

As such a colloidal silica, commercially available products can be used, and specific examples thereof include "Snowtex-XL", "Snowtex-YL", "Snowtex-ZL", "PST-2", "Snowtex-20", "Snowtex-30", "Snowtex-C", "Snowtex-O", "Snowtex-OS", "Snowtex-OL" and "Snowtex-50" by trade names (the above-mentioned are made by Nissan Chemical Industries, Ltd.), and "Adelite AT-30", "Adelite AT-40" and "Adelite AT-50" by trade names (the above-mentioned are made by Nippon Aerosil Co., Ltd.). Among these, especially preferable are "Snowtex-O", "Snowtex-OS", "Snowtex-OL" by trade names, and the like.

Also as colloidal inorganic particles other than the above-mentioned colloidal silicas, commercially available products can be used, and specific examples thereof include an alumina sol (hydrosol) such as "Alumina Sol 100", "Alumina Sol 200" and "Alumina Sol 520" by trade names (the above-mentioned are made by Nissan Chemical Industries, Ltd.), a titania sol (hydrosol) such as "TTO-W-5" by trade name (made by Ishihara Sangyo Kaisha Ltd.) and "TS-020" by trade name (made by Tayca Corp.), and tin oxide water dispersions such as "SN-100D" and "SN-100S" by trade names (the above-mentioned are made by Ishihara Sangyo Kaisha Ltd.).

In the present invention, it is preferable that the inorganic oxide particle is a colloidal silica whose primary particle diameter is in the range of 1 nm to 500 µm and whose surface potential is in the range of pH 2 to 5, and the silanol group of the colloidal silica surface chemically bonds with a polysiloxane resin to crosslink the polysiloxane resin.

The content (or the content of inorganic oxide particle in a film) of an inorganic oxide particle in the inorganic oxide particle-containing condensation-reactive silicone resin can suitably be selected, but the upper limit is, for example, 30 wt %, preferably 20 wt %, and more preferably 15 wt %; and the lower limit is, for example, 1 wt %, preferably 2 wt %, and more preferably 3 wt %. If the content of an inorganic oxide particle is too low, the mechanical strength of a film is liable to decrease; and if the content of an inorganic oxide particle is too high, the film is liable to become brittle.

Then, a method for producing the inorganic oxide particle-containing condensation-reactive silicone resin will be described.

The inorganic oxide particle-containing condensation-reactive silicone resin can be produced, for example, by allowing the inorganic oxide particle and the polysiloxane resin having a condensation-reactive group (preferably, the condensation-reactive group-containing polysilsesquioxane, or the D-T unit condensation-reactive group-containing polysiloxane and the condensation-reactive group-containing polysilsesquioxane, or these and the polysiloxane resin having a silanol group) to react in a solvent, preferably in the presence of an acid. Here, the polysiloxane resin has a functional group reactive with a reactive functional group on the particle surface of the inorganic oxide particle. In the case where the reactive functional group on the particle surface of the inorganic oxide particle is a silanol group, the condensation-reactive group reacts with the silanol group to form a crosslinked structure.

The solvent includes water, alcohols such as methanol, ethanol, 2-propanol and 2-methoxyethanol, and mixed liquids thereof. Among these, mixed solvents of water and an alcohol are preferable, and more preferable are a mixed solvent of water and 2-propanol and a mixed solvent of water and 2-propanol and 2-methoxyethanol.

Examples of the acid include inorganic acids such as hydrochloric acid, nitric acid, sulfuric acid and phosphoric acid; and organic acids such as acetic acid and p-toluenesulfonic acid. Among these, inorganic acids are preferable, and nitric acid is especially preferable. These acids can be used as an aqueous solution. The amount of an acid used can be in an amount capable of regulating the pH of a reaction system at about 2 to 5 (preferably 2 to 4).

The reaction method is not especially limited, and may be any of, for example, (i) a method in which a mixed liquid of a polysiloxane resin and a solvent is added to a mixed liquid of an inorganic oxide particle and a solvent, (ii) a method in which a mixed liquid of an inorganic oxide particle and a solvent is added to a mixed liquid of a polysiloxane resin and a solvent, and (iii) a method in which a mixed liquid of an inorganic oxide particle and a solvent and a mixed liquid of a polysiloxane resin and a solvent are both added to a solvent.

In the case of concurrently using a D-T unit condensation-reactive group-containing polysiloxane and a condensation-reactive group-containing polysilsesquioxane as polysiloxane resins, an inorganic oxide particle and a mixture of the D-T unit condensation-reactive group-containing polysiloxane and the condensation-reactive group-containing polysilsesquioxane may be allowed to react; or, the D-T unit condensation-reactive group-containing polysiloxane may be first allowed to react with the inorganic oxide particle, and the condensation-reactive group-containing polysilsesquioxane may be then allowed to react; or, the condensation-reactive group-containing polysilsesquioxane may be first allowed to react with the inorganic oxide particle, and the D-T unit condensation-reactive group-containing polysiloxane may be then allowed to react. In the present invention, if a method is employed in which a condensation-reactive group-silyl group-containing polysilsesquioxane is first allowed to react with an inorganic oxide particle, and a D-T unit condensation-reactive group-containing polysiloxane and/or a polysiloxane resin having a silanol group is then allowed to react, and in the case of coating at least one surface of a base material with the silicone resin to thereby provide a film composed of the silicone resin, the flexibility of the film is greatly improved.

The upper limit of the reaction temperature is, for example, 150° C., and preferably 130° C.; and the lower limit is, for example, 40° C., and preferably 50° C. The upper limit of the reaction time is, for example, 24 hours, and preferably 12 hours; and the lower limit is, for example, 0.2 hours, and preferably 0.5 hours.

After the completion of the reaction, as required, by distilling away the solvent and regulating the concentration and the viscosity, a silicone resin composition (C) containing at least an inorganic oxide particle-containing condensation-reactive silicone resin can be obtained.

In the present invention, the silicone resin composition (C) containing at least an inorganic oxide particle-containing condensation-reactive silicone resin may contain: a condensation-reactive silicone resin (A) comprising a crosslinked structural body wherein an inorganic oxide particle dispersed in the polysiloxane resin having a condensation-reactive group and the polysiloxane resin are crosslinked through a chemical bond; and an inorganic particle (B). The case of using such a silicone resin composition remarkably improves the flame resistance, and can provide a sheet not spreading fire in flame contact, and further a sheet not igniting or carbonizing, even if the sheet has a flammable base material and the thickness of the base material is relatively thin.

[Inorganic Particle (B)]

The inorganic particle (B) is not especially limited, and examples thereof include silica particles, alumina particles, aluminum hydroxide particles, titanium oxide particles, magnesium oxide particles, magnesium hydroxide particles, tin oxide particles, zirconia particles, clay mineral particles (talc, zeolite and the like), and glass frits. These can be used singly or in combinations of not less than two. The inorganic particle (B) is in the state of not being chemically bonded with the polysiloxane resin having a condensation-reactive group.

Among the above, silica particles, alumina particles, aluminum hydroxide particles, magnesium hydroxide particles, and glass frits are preferable, from the viewpoint of providing a high flame-resistant effect in a small amount thereof. Silica particles and glass frits are more preferable from the viewpoint of further providing the transparency; and glass frits are especially preferable particularly from the viewpoint of providing a heat generation suppressing effect in the cone calorimeter test.

Examples of the silica particle include dry silica particles such as fumed silica particles and fused silica particles, wet silica particles, silica gel particles, and colloidal silica particles. Among these silica particles, fumed silica particles such as Aerosil are preferable, and hydrophobic fumed silica particles are especially preferable.

The deformation point of the glass frit is preferably 300 to 700° C., more preferably 300 to 650° C., and still more preferably 300 to 600° C. In the case of fabricating a flame-resistant composite member by making the deformation point of the glass frit in the above range, the effect of suppressing the amount of heat generated by the composite member in the cone calorimeter test can sufficiently be developed.

As the glass frit, any suitable glass frit can be employed. Such a glass frit is preferably a sinterable inorganic particle (glass frit), and more preferably an inorganic particle (glass frit) formed of at least one component selected from silicic acid (or silicon oxide), boric acid (or boron oxide), borosilicic acid, aluminum oxide, calcium oxide, sodium oxide, lithium oxide and phosphorus oxide. Typical glass frits include phosphate glass frits, borosilicate glass frits, alkali-free glass frits and porcelain frits. An especially preferable glass frit is a glass frit formed of at least a component containing phosphorus oxide. In the glass frit formed of at least a component containing phosphorus oxide, the content of phosphorus oxide is, for example, 5 to 70 wt %; and the lower limit thereof is preferably 10 wt %, and more preferably 20 wt %; and the upper limit is preferably 60 wt %, and more preferably 50 wt %. In the case of fabricating a flame-resistant composite member by employing a glass frit as described above, the effect of suppressing the amount of heat generated by the composite member in the cone calorimeter test can sufficiently be developed.

The average particle diameter of a glass frit is preferably 0.1 μm to 1,000 μm. The lower limit of the average particle diameter of a glass frit is more preferably 0.5 μm, still more preferably 1 μm, and especially preferably 2 μm. The upper limit of the average particle diameter of a glass frit is more preferably 500 μm, still more preferably 300 μm, and especially preferably 150 μm. In the case of fabricating a flame-resistant composite member by making the average particle diameter of a glass frit in the above range, the effect of suppressing the amount of heat generated by the composite member in the cone calorimeter test can sufficiently be developed.

As the inorganic particle (B), an inorganic particle having a hollow structure may be used. Examples of such an inorganic particle include silicas having a hollow structure, and glass frits (phosphate glass frits and the like) having a hollow structure (including hollow glass beads).

With respect to the average particle diameter (primary particle diameter) of an inorganic particle (B), the upper limit is, for example, 500 μm, preferably 300 μm, more preferably 200 μm, and especially preferably 100 μm; and the lower limit is, for example, 1 nm. Here, the average particle diameter can be measured by a dynamic light scattering method or the like.

In the present invention, the content of an inorganic particle (B) in the silicone resin composition (C) is, for example, 0.1 to 500 parts by weight with respect to 100 parts by weight of the condensation-reactive silicone resin (A); the upper limit is preferably 400 parts by weight, and especially preferably 300 parts by weight; and the lower limit is preferably 0.5 parts by weight, more preferably 1 part by weight, and especially preferably 2 parts by weight.

A silicone resin composition containing the condensation-reactive silicone resin (A) and the inorganic particle (B) can be produced, for example, by adding the inorganic particle (B) to a silicone resin composition containing the condensation-reactive silicone resin (A) obtained by the above method.

In the present invention, additives such as a curing catalyst, as required, may be added to the silicone resin composition (C).

In the present invention, with respect to the solid content concentration of the silicone resin composition (C), from the viewpoint of the handleability, the coatability, the impregnatability and the like, the upper limit is, for example, 95 wt %, and preferably 90 wt %; and the lower limit is, for example, 30 wt %, and preferably 40 wt %.

[Flame-Resistant Composite Member]

The flame-resistant composite member according to the present invention can be produced by providing a film (coated layer: flame-resistant silicone resin layer) formed of a silicone resin composition (C) containing at least the above-mentioned inorganic oxide particle-containing condensation-reactive silicone resin on at least one surface of a base material.

The flame-resistant composite member according to the present invention can be produced, for example, by forming a film by coating at least one surface of a base material with a silicone resin composition (C) containing at least the above inorganic oxide particle-containing condensation-reactive silicone resin.

A method for coating with the silicone resin composition (C) is not especially limited; and the silicone resin composition (C) is directly applied, for example, by a well-known coating method such as kiss coating, gravure coating, bar coating, spray coating, knife coating, wire coating, dip coating, die coating, curtain coating, dispenser coating, screen printing or metal mask printing, to thereby form a coated film; and as required, for example, the film is dried at a temperature of about 80 to 150° C. to thereby provide a flame-resistant composite member 3 having a film (coated layer) 2 comprising an inorganic oxide particle-containing silicone resin on one surface (or both surfaces) of a base material 1 as shown in FIG. 1.

The flame-resistant composite member according to the present invention can also be produced by forming a film by coating a thin sheet body with a silicone resin composition (C) containing at least the above inorganic oxide particle-containing condensation-reactive silicone resin, and laminating the film on at least one surface of a base material.

For the storage stability of the silicone resin composition (C) and in order to reduce bubble faults and the appearance unevenness in the film formation, the coating is preferably carried out by adding a water-soluble organic solvent excluding aliphatic monovalent alcohols to the silicone resin composition (C). The amount of the water-soluble organic solvent excluding aliphatic monovalent alcohols used is not especially limited, but is, for example, 0.01 to 200 parts by weight, and preferably 0.1 to 150 parts by weight, with respect to 100 parts by weight of the silicone resin composition (C) (solid content).

Specific examples of the water-soluble organic solvent excluding aliphatic monovalent alcohols include glycol ether-based solvents such as methyl cellosolve (2-methoxyethanol), ethyl cellosolve (2-ethoxyethanol), ethylene glycol isopropyl ether, butyl cellosolve, carbitol, butylcarbitol, diethylene glycol acetate, ethylene glycol monophenyl ether, ethylene glycol monobenzyl ether, methoxymethoxyethanol, propylene glycol monomethyl ether, propylene glycol monoethyl ether and ethylene glycol monoacetate, glycol-based solvents such as ethylene glycol, tetraethylene glycol, propylene glycol and dipropylene glycol, nitrogen-containing solvents such as N-methylpyrrolidone, dimethylformamide and dimethylacetamide, and dimethyl sulfoxide. In the case of using these, these may be used singly or in combinations of not less than two. Among these, glycol ether-based solvents are preferable from the viewpoint of having a good solubility to hydrolyzed alkoxysilanes and condensates thereof.

The upper limit of the thickness of the film 2 is, for example, 1,000 μm, preferably 800 μm, and more preferably 500 μm; and the lower limit is, for example, 5 μm, preferably 10 μm, and more preferably 20 μm.

In the flame-resistant composite member according to the present invention, a protecting layer may be provided on the surface of the film formed of a silicone resin composition (C), and the main component of the protecting layer is preferably a polymer. The protecting layer is preferably, for example, at least one selected from the group consisting of ultraviolet curing hard coat layers, thermosetting hard coat layers and organic-inorganic hybrid hard coat layers. The protecting layer may be composed of only one layer or not less than two layers.

An ultraviolet curing hard coat layer can be formed from a resin composition containing an ultraviolet curing resin. A thermosetting hard coat layer can be formed from a resin composition containing a thermosetting resin. An organic-inorganic hybrid hard coat layer can be formed from a resin composition containing an organic-inorganic hybrid resin.

Curing compounds used for resins as described above more specifically include: monomers, oligomers and/or polymers having at least one selected from the group consisting of a silanol group, a precursor of a silanol group (for example, an alkoxysilyl group or a chlorosilyl group), an acryloyl group, a methacryloyl group, a cyclic ether group, an amino group and an isocyanate group; and silazane compounds. The incorporation of monomers, oligomers and/or polymers having a silanol group is preferable from the viewpoint that the surface hardly carbonizes in combustion.

The resin compositions can further contain any suitable additives according to the purpose. Examples of the additives include photopolymerization initiators, silane coupling agents, mold release agents, curing agents, curing accelerators, diluents, antiaging agents, modifying agents, surfactants, dyes, pigments, discoloration preventing agents, ultraviolet absorbents, softening agents, stabilizers, plasticizers and defoaming agents. The kinds, the number and the amounts of additives contained in the resin composition can suitably be set according to the purpose.

The thickness of the protecting layer is not especially limited, but is, for example, 0.1 to 200 μm, preferably 0.2 to 100 μm, and more preferably 0.5 to 50 μm. If the thickness of the protecting layer is in the above range, the excellent scratch resistance can be developed without impairing the flame resistance of the flame-resistant composite member according to the present invention.

The thickness of the flame-resistant composite member according to the present invention can suitably be selected according to applications, but the upper limit is usually 6,000 μm, preferably 5,000 μm, more preferably 4,000 μm, and still more preferably 3,000 μm; and the lower limit is, for example, 50 μm, preferably 90 μm, more preferably 120 μm, and especially preferably 170 μm.

The flame-resistant composite member according to the present invention has excellent flame resistance, and preferably has nonflammability. The flame-resistant composite member hardly spreads fire or does not spread fire, for example, in a test according to the combustion test (for a general material: the 45° ethyl alcohol test of a railway rolling stock nonmetal material) of the Japan Railway Rolling Stock & Machinery Association. Preferably, no carbonization is observed on the surface. Here, in the present description, the nonflammability means such a property that in the above combustion test, the surface of the member does not ignite or carbonize.

The flame-resistant composite member according to the present invention has excellent flame resistance, and preferably has a small amount of heat generated and a low heat generation rate. For example, also in a test according to the cone calorimeter test (for a ceiling material: ISO 5660-1) of the Japan Railway Rolling Stock & Machinery Association, the amount of heat generated and the maximum heat generation rate of the member can be reduced, and the ignition time can be retarded. Preferably, the total amount of heat generated per 10 min is not more than 30 $MJ/m^2$; the maximum heat generation rate is not more than 300 $kW/m^2$; and the ignition time is not less than 60 sec.

The flame-resistant composite member according to the present invention, since being excellent in the flame resistance, can be utilized as interior members (transport machinery interior members) of transport machinery such as railway rolling stock, air carriers, automobiles, ships, elevators and escalators, building material members, display members, household appliance members and electronic circuit members. The flame-resistant composite member can suitably be utilized also as illumination covers, particularly as illumination covers as transport machinery interior members.

The flame-resistant composite member according to the present invention can be used also as members deformed from plate-like materials by thermoforming. A thermoforming method of plate-like materials can utilize well-known methods such as bending, press forming, vacuum forming and air pressure forming.

The flame-resistant composite member according to the present invention can be imparted with functional layers such as a hard coat layer, an antifouling layer, an antistatic layer, a light diffusion layer, an antireflection layer, an ultraviolet absorption layer, a heat barrier layer, a heat insulation layer, a heat transfer layer and a solvent resistant layer, in the range of not impairing the flame resistance.

The flame-resistant composite member according to the present invention may contain any suitable other components in the base material and the film in the range of not impairing the flame resistance. One or not less than two of such other components may be contained.

Examples of the other components include other polymer components, softening agents, antioxidants, antiaging agents, curing agents, plasticizers, fillers, thermopolymerization initiators, photopolymerization initiators, ultraviolet absorbents, light stabilizers, colorants (pigments, dyes and the like), solvents (organic solvents), surfactants (for example, ionic surfactants, silicone-based surfactants and fluorine-based surfactants).

The illumination apparatus according to the present invention is an illumination apparatus using the above-mentioned flame-resistant composite member, and has, at least, a light source to generate light used for illumination, and an illumination cover installed so as to cover the light source and having the flame-resistant composite member, wherein light from the light source is transmitted through the flame-resistant composite member and emitted.

In the illumination apparatus, the fixation method of the illumination cover, the arrangement of the illumination cover, and the like are not especially limited, and well-known methods and arrangements can be employed.

EXAMPLES

Hereinafter, the present invention will be described more specifically by way of Examples and Comparative Examples. However, the present invention is not any more limited thereto. In the following description, "parts" and "%" are in terms of weight unless otherwise specified.

Synthesis Example 1

25 g of a colloidal silica solution (trade name: Snowtex OS, made by Nissan Chemical Industries, Ltd., solid content concentration: 20%) having an average particle diameter of 8 to 11 nm, and 42 g of 2-propanol were added to a vessel equipped with a stirrer, a reflux cooler and a nitrogen introducing tube. A concentrated nitric acid was added thereto to regulate the acidity (pH) of the liquid in the range of 2 to 4. Then, the liquid was heated to 65° C., and thereafter, a liquid in which 75 g of a silsesquioxane compound (trade name: X-40-9225, made by Shin-Etsu Chemical Co., Ltd., methoxy content: 24%) having a reactive methoxysilyl group at the molecular terminal was dissolved in 75 g of 2-propanol was dropped over 2 hours by using a dropping funnel to thereby allow the silsesquioxane compound and the colloidal silica particle surface to react.

Then, a liquid in which 25 g of a polysiloxane compound (trade name: X-40-9246, made by Shin-Etsu Chemical Co., Ltd., methoxy content: 12%) derived from a trifunctional alkoxysilane and a bifunctional alkoxysilane having reactive methoxysilyl groups at the molecular terminals was dissolved in 25 g of 2-propanol was dropped over 1 hour to be allowed to react with the silsesquioxane compound on the colloidal silica. The resultant was stirred under heating at 65° C. for 1 hour, thereafter cooled to room temperature (25° C.), and concentrated by distilling away the solvent under reduced pressure to thereby obtain a liquid transparent resin composition solution A.

Synthesis Example 2

A transparent resin composition solution B was obtained by using the similar experimental apparatus as in Synthesis Example 1 and by the similar process as in Synthesis Example 1, except for altering the amount of X-40-9225 to 67 g, the amount of 2-propanol to dissolve this to 67 g, the amount of X-40-9246 to 33 g, and the amount of 2-propanol to dissolve this to 33 g.

Synthesis Example 3

A transparent resin composition solution C was obtained by using the similar experimental apparatus as in Synthesis Example 1 and by the similar process as in Synthesis Example 1, except for altering the amount of X-40-9225 to 83 g, the amount of 2-propanol to dissolve this to 83 g, the amount of X-40-9246 to 17 g, and the amount of 2-propanol to dissolve this to 17 g.

Synthesis Example 4

A transparent resin composition solution D was obtained by using the similar experimental apparatus as in Synthesis Example 1 and by the similar process as in Synthesis Example 1, except for altering the amount of X-40-9225 to 92 g, the amount of 2-propanol to dissolve this to 92 g, the amount of X-40-9246 to 8 g, and the amount of 2-propanol to dissolve this to 8 g.

Synthesis Example 5

A transparent resin composition solution E was obtained by using the similar experimental apparatus as in Synthesis Example 1 and by the similar process as in Synthesis Example 1, except for altering the amount of X-40-9225 to 100 g, and the amount of 2-propanol to dissolve this to 100 g, and not adding X-40-9246 and 2-propanol to dissolve this.

Example 1

The transparent resin composition solution A was applied on a polycarbonate plate (thickness: 2,000 μm, trade name: "PC1600", made by Takiron Co., Ltd.) so that the thickness after drying became 45 μm by using an applicator made by Tester Sangyo Co., Ltd., thereafter dried in a hot air circulation-type oven at 90° C. for 5 min, and thereafter dried at 120° C. for 5 min to thereby obtain a formed body (flame-resistant composite member).

Example 2

The transparent resin composition solution A was applied on a polypropylene plate (thickness: 2,000 μm, trade name: "Kobe Polysheet Polypropylene Plate PP-N-AN", made by Shin-Kobe Electric Machinery Co., Ltd.) so that the thickness after drying became 45 μm by using an applicator made by Tester Sangyo Co., Ltd., and thereafter dried in a hot air circulation-type oven at 90° C. for 5 min to thereby obtain a formed body (flame-resistant composite member).

Example 3

The transparent resin composition solution A was applied on a polyethylene plate (thickness: 2,000 μm, trade name: "Kobe Polysheet Polyethylene Plate EL-N-AN", made by Shin-Kobe Electric Machinery Co., Ltd.) so that the thickness after drying became 45 μm by using an applicator made by Tester Sangyo Co., Ltd., and thereafter dried in a hot air circulation-type oven at 90° C. for 5 min to thereby obtain a formed body (flame-resistant composite member).

Example 4

The transparent resin composition solution A was applied on an acryl plate (thickness: 2,000 μm, trade name: "Acrylite 001", made by Mitsubishi Rayon Co., Ltd.) so that the thickness after drying became 45 μm by using an applicator made by Tester Sangyo Co., Ltd., and thereafter dried in a hot air circulation-type oven at 90° C. for 5 min to thereby obtain a formed body (flame-resistant composite member).

Example 5

The transparent resin composition solution A was applied on a polystyrene plate (thickness: 2,000 μm, trade name: "PS", made by RP Topla Ltd.) so that the thickness after drying became 45 μm by using an applicator made by Tester Sangyo Co., Ltd., and thereafter dried in a hot air circulation-type oven at 90° C. for 5 min to thereby obtain a formed body (flame-resistant composite member).

Example 6

The transparent resin composition solution A was applied on a polycarbonate sheet (thickness: 200 μm, trade name: "200KK", made by Kaneka Corp.) so that the thickness after drying became 50 μm by using an applicator made by Tester Sangyo Co., Ltd., thereafter dried in a hot air circulation-type oven at 90° C. for 3 min, and thereafter dried at 120° C. for 15 min to thereby obtain a formed body (flame-resistant composite member).

Example 7

The transparent resin composition solution A was applied on a polypropylene sheet (thickness: 1,000 μm, trade name: "V37922", made by Okamoto Industries, Inc.) so that the thickness after drying became 50 μm by using an applicator made by Tester Sangyo Co., Ltd., and thereafter dried in a hot air circulation-type oven at 90° C. for 30 min to thereby obtain a formed body (flame-resistant composite member).

Example 8

The transparent resin composition solution A was applied on a polypropylene sheet (thickness: 750 μm, trade name: "V37976", made by Okamoto Industries, Inc.) so that the thickness after drying became 50 μm by using an applicator made by Tester Sangyo Co., Ltd., and thereafter dried in a hot air circulation-type oven at 90° C. for 30 min to thereby obtain a formed body (flame-resistant composite member).

Example 9

The transparent resin composition solution A was applied on a polypropylene sheet (thickness: 500 μm, trade name: "V38241", made by Okamoto Industries, Inc.) so that the thickness after drying became 90 μm by using an applicator made by Tester Sangyo Co., Ltd., and thereafter dried in a hot air circulation-type oven at 90° C. for 30 min to thereby obtain a formed body (flame-resistant composite member).

Example 10

The transparent resin composition solution B was applied on a polycarbonate plate (thickness: 2,000 μm, trade name: "PC1600", made by Takiron Co., Ltd.) so that the thickness after drying became 45 μm by using an applicator made by Tester Sangyo Co., Ltd., thereafter dried in a hot air circulation-type oven at 90° C. for 5 min, and thereafter dried at 120° C. for 5 min to thereby obtain a formed body (flame-resistant composite member).

Example 11

The transparent resin composition solution C was applied on a polycarbonate plate (thickness: 2,000 μm, trade name: "PC1600", made by Takiron Co., Ltd.) so that the thickness after drying became 45 μm by using an applicator made by Tester Sangyo Co., Ltd., thereafter dried in a hot air circulation-type oven at 90° C. for 5 min, and thereafter dried at 120° C. for 5 min to thereby obtain a formed body (flame-resistant composite member).

Example 12

The transparent resin composition solution D was applied on a polycarbonate plate (thickness: 2,000 μm, trade name: "PC1600", made by Takiron Co., Ltd.) so that the thickness after drying became 45 μm by using an applicator made by Tester Sangyo Co., Ltd., thereafter dried in a hot air circulation-type oven at 90° C. for 5 min, and thereafter dried at 120° C. for 5 min to thereby obtain a formed body (flame-resistant composite member).

Example 13

The transparent resin composition solution E was applied on a polycarbonate plate (thickness: 2,000 μm, trade name: "PC1600", made by Takiron Co., Ltd.) so that the thickness after drying became 45 μm by using an applicator made by Tester Sangyo Co., Ltd., thereafter dried in a hot air circulation-type oven at 90° C. for 5 min, and thereafter dried at 120° C. for 5 min to thereby obtain a formed body (flame-resistant composite member).

Comparative Example 1

A polycarbonate plate (thickness: 2,000 μm, trade name: "PC1600", made by Takiron Co., Ltd.) as a single material was used for evaluation.

Comparative Example 2

A polypropylene plate (thickness: 2,000 μm, trade name: "Kobe Polysheet Polypropylene Plate PP-N-AN", made by Shin-Kobe Electric Machinery Co., Ltd.) as a single material was used for evaluation.

Comparative Example 3

A polyethylene plate (thickness: 2,000 μm, trade name: "Kobe Polysheet Polyethylene Plate EL-N-AN", made by Shin-Kobe Electric Machinery Co., Ltd.) as a single material was used for evaluation.

Comparative Example 4

An acryl plate (thickness: 2,000 μm, trade name: "Acrylite 001", made by Mitsubishi Rayon Co., Ltd.) as a single material was used for evaluation.

Comparative Example 5

A polystyrene plate (thickness: 2,000 μm, trade name: "PS", made by RP Topla Ltd.) as a single material was used for evaluation.

Comparative Example 6

A polycarbonate sheet (thickness: 200 μm, trade name: "200KK", made by Kaneka Corp.) as a single material was used for evaluation.

Comparative Example 7

A polypropylene sheet (thickness: 1,000 μm, trade name: "V37922", made by Okamoto Industries, Inc.) as a single material was used for evaluation.

Comparative Example 8

A polypropylene sheet (thickness: 750 μm, trade name: "V37976", made by Okamoto Industries, Inc.) as a single material was used for evaluation.

Comparative Example 9

A polypropylene sheet (thickness: 500 trade name: "V38241", made by Okamoto Industries, Inc.) as a single material was used for evaluation.

Synthesis Example 6

25 g of a colloidal silica solution (trade name: Snowtex OS, made by Nissan Chemical Industries, Ltd., solid content concentration: 20%) having an average particle diameter of 8 to 11 nm, and 42 g of 2-propanol were added to a vessel equipped with a stirrer, a reflux cooler and a nitrogen introducing tube. A concentrated nitric acid was added thereto to regulate the acidity (pH) of the liquid in the range of 2 to 4. Then, the liquid was heated to 65° C., and thereafter, a liquid in which 75 g of a silsesquioxane compound (trade name: X-40-9225, made by Shin-Etsu Chemical Co., Ltd., methoxy content: 24%) having a reactive methoxysilyl group at the molecular terminal was dissolved in 75 g of 2-propanol was dropped over 2 hours by using a dropping funnel to thereby allow the silsesquioxane compound and the colloidal silica particle surface to react.

Then, a liquid in which 25 g of a polysiloxane compound (trade name: X-40-9246, made by Shin-Etsu Chemical Co., Ltd., methoxy content: 12%) derived from a trifunctional alkoxysilane and a bifunctional alkoxysilane having reactive methoxysilyl groups at the molecular terminals was dissolved in 25 g of 2-propanol was dropped over 1 hour to be allowed to react with the silsesquioxane compound on the colloidal silica. The resultant was stirred under heating at 65° C. for 1 hour, and thereafter cooled to room temperature (25° C.) to thereby obtain a liquid transparent resin composition solution F.

Synthesis Example 7

50 g of a colloidal silica solution (trade name: Snowtex OS, made by Nissan Chemical Industries, Ltd., solid content concentration: 20%) having an average particle diameter of 8 to 11 nm, and 84 g of 2-propanol were added to a vessel equipped with a stirrer, a reflux cooler and a nitrogen introducing tube. A concentrated nitric acid was added thereto to regulate the acidity (pH) of the liquid in the range of 2 to 4. Then, the liquid was heated to 65° C., and thereafter, a liquid in which 75 g of a silsesquioxane compound (trade name: X-40-9225, made by Shin-Etsu Chemical Co., Ltd., methoxy content: 24%) having a reactive methoxysilyl group at the molecular terminal was dissolved in 75 g of 2-propanol was dropped over 2 hours by using a dropping funnel to thereby allow the silsesquioxane compound and the colloidal silica particle surface to react.

Then, a liquid in which 25 g of a polysiloxane compound (trade name: X-40-9246, made by Shin-Etsu Chemical Co., Ltd., methoxy content: 12%) derived from a trifunctional alkoxysilane and a bifunctional alkoxysilane having reactive methoxysilyl groups at the molecular terminals was dissolved in 25 g of 2-propanol was dropped over 1 hour to be allowed to react with the silsesquioxane compound on the colloidal silica. The resultant was stirred under heating at 65° C. for 1 hour, and thereafter cooled to room temperature (25° C.) to thereby obtain a liquid transparent resin composition solution G.

Synthesis Example 8

75 g of a colloidal silica solution (trade name: Snowtex OS, made by Nissan Chemical Industries, Ltd., solid content concentration: 20%) having an average particle diameter of 8 to 11 nm, and 126 g of 2-propanol were added to a vessel equipped with a stirrer, a reflux cooler and a nitrogen introducing tube. A concentrated nitric acid was added thereto to regulate the acidity (pH) of the liquid in the range of 2 to 4. Then, the liquid was heated to 65° C., and thereafter, a liquid in which 75 g of a silsesquioxane compound (trade name: X-40-9225, made by Shin-Etsu Chemical Co., Ltd., methoxy content: 24%) having a reactive methoxysilyl group at the molecular terminal was dissolved in 75 g of 2-propanol was dropped over 2 hours by using a dropping funnel to thereby allow the silsesquioxane compound and the colloidal silica particle surface to react.

Then, a liquid in which 25 g of a polysiloxane compound (trade name: X-40-9246, made by Shin-Etsu Chemical Co., Ltd., methoxy content: 12%) derived from a trifunctional alkoxysilane and a bifunctional alkoxysilane having reactive methoxysilyl groups at the molecular terminals was dissolved in 25 g of 2-propanol was dropped over 1 hour to be allowed to react with the silsesquioxane compound on the colloidal silica. The resultant was stirred under heating at 65° C. for 1 hour, and thereafter cooled to room temperature (25° C.) to thereby obtain a liquid transparent resin composition solution H.

Synthesis Example 9

25 g of a colloidal silica solution (trade name: Snowtex OS, made by Nissan Chemical Industries, Ltd., solid content concentration: 20%) having an average particle diameter of 8 to 11 nm, and 42 g of 2-propanol were added to a vessel equipped with a stirrer, a reflux cooler and a nitrogen introducing tube. A concentrated nitric acid was added thereto to regulate the acidity (pH) of the liquid in the range of 2 to 4. Then, the liquid was heated to 65° C., and thereafter, a liquid in which 67 g of a silsesquioxane compound (trade name: X-40-9225, made by Shin-Etsu Chemical Co., Ltd., methoxy content: 24%) having a reactive methoxysilyl group at the molecular terminal was dissolved in 67 g of 2-propanol was dropped over 2 hours by using a dropping funnel to thereby allow the silsesquioxane compound and the colloidal silica particle surface to react.

Then, a liquid in which 33 g of a polysiloxane compound (trade name: X-40-9246, made by Shin-Etsu Chemical Co., Ltd., methoxy content: 12%) derived from a trifunctional alkoxysilane and a bifunctional alkoxysilane having reactive methoxysilyl groups at the molecular terminals was dissolved in 33 g of 2-propanol was dropped over 1 hour to be allowed to react with the silsesquioxane compound on the colloidal silica. The resultant was stirred under heating at 65° C. for 1 hour, and thereafter cooled to room temperature (25° C.) to thereby obtain a liquid transparent resin composition solution I.

Synthesis Example 10

50 g of a colloidal silica solution (trade name: Snowtex OS, made by Nissan Chemical Industries, Ltd., solid content concentration: 20%) having an average particle diameter of 8 to 11 nm, and 84 g of 2-propanol were added to a vessel equipped with a stirrer, a reflux cooler and a nitrogen introducing tube. A concentrated nitric acid was added thereto to regulate the acidity (pH) of the liquid in the range of 2 to 4. Then, the liquid was heated to 65° C., and thereafter, a liquid in which 58 g of a silsesquioxane compound (trade name: X-40-9225, made by Shin-Etsu Chemical Co., Ltd., methoxy content: 24%) having a reactive methoxysilyl group at the molecular terminal was dissolved in 58 g of 2-propanol was dropped over 2 hours by using a dropping funnel to thereby allow the silsesquioxane compound and the colloidal silica particle surface to react.

Then, a liquid in which 42 g of a polysiloxane compound (trade name: X-40-9246, made by Shin-Etsu Chemical Co., Ltd., methoxy content: 12%) derived from a trifunctional alkoxysilane and a bifunctional alkoxysilane having reactive methoxysilyl groups at the molecular terminals was dissolved in 42 g of 2-propanol was dropped over 1 hour to be allowed to react with the silsesquioxane compound on the colloidal silica. The resultant was stirred under heating at 65° C. for 1 hour, and thereafter cooled to room temperature (25° C.) to thereby obtain a liquid transparent resin composition solution J.

Example 14

15 parts by weight of a silica particle (trade name: "AEROSIL R8200", made by Nippon Aerosil Co., Ltd.) with respect to 100 parts by weight of the solid content in the transparent resin composition solution F obtained in Synthesis Example 6 was added to the transparent resin composition solution F, and stirred and mixed to thereby obtain a silicone resin composition A.

Example 15

12 parts by weight of a silica particle (trade name: "Admafine Silica SC1500-GDO", made by Admatex Co., Ltd.) with respect to 100 parts by weight of the solid content in the transparent resin composition solution F obtained in Synthesis Example 6 was added to the transparent resin composition solution F, and stirred and mixed to thereby obtain a silicone resin composition B.

Example 16

24 parts by weight of a silica particle (trade name: "Admafine Silica SC1500-GDO", made by Admatex Co., Ltd.) with respect to 100 parts by weight of the solid content in the transparent resin composition solution F obtained in Synthesis Example 6 was added to the transparent resin composition solution F, and stirred and mixed to thereby obtain a silicone resin composition C.

Example 17

3 parts by weight of a silica particle (trade name: "AEROSIL R104", made by Nippon Aerosil Co., Ltd.) with respect to 100 parts by weight of the solid content in the transparent resin composition solution G obtained in Synthesis Example 7 was added to the transparent resin composition solution G, and stirred and mixed to thereby obtain a silicone resin composition D.

Example 18

3 parts by weight of a silica particle (trade name: "AEROSIL R104", made by Nippon Aerosil Co., Ltd.) with respect to 100 parts by weight of the solid content in the transparent resin composition solution H obtained in Synthesis Example 8 was added to the transparent resin composition solution H, and stirred and mixed to thereby obtain a silicone resin composition E.

Example 19

6 parts by weight of a silica particle (trade name: "AEROSIL R104", made by Nippon Aerosil Co., Ltd.) with respect to 100 parts by weight of the solid content in the transparent resin composition solution H obtained in Synthesis Example 8 was added to the transparent resin composition solution H, and stirred and mixed to thereby obtain a silicone resin composition F.

Example 20

3 parts by weight of a silica particle (trade name: "AEROSIL R974", made by Nippon Aerosil Co., Ltd.) with respect to 100 parts by weight of the solid content in the transparent resin composition solution H obtained in Synthesis Example 8 was added to the transparent resin composition solution H, and stirred and mixed to thereby obtain a silicone resin composition G.

Example 21

3 parts by weight of a silica particle (trade name: "AEROSIL R104", made by Nippon Aerosil Co., Ltd.) and 3 parts by weight of a glass frit (trade name: "VY0144-M2", made by Nippon Frit Co., Ltd.) with respect to 100 parts by weight of the solid content in the transparent resin composition solution G obtained in Synthesis Example 7 were added to the transparent resin composition solution G, and stirred and mixed to thereby obtain a silicone resin composition H.

Example 22

3 parts by weight of a silica particle (trade name: "AEROSIL R104", made by Nippon Aerosil Co., Ltd.) and 3 parts by weight of an aluminum hydroxide particle (trade name: "HIGILITE H-10", made by Showa Denko K.K.) with respect to 100 parts by weight of the solid content in the transparent resin composition solution G obtained in Synthesis Example 7 were added to the transparent resin composition solution G, and stirred and mixed to thereby obtain a silicone resin composition I.

Example 23

200 parts by weight of a glass frit (trade name: "VY0144M", made by Nippon Frit Co., Ltd.) with respect to 100 parts by weight of the solid content in the transparent resin composition solution G obtained in Synthesis Example 7 was added to the transparent resin composition solution G, and stirred and mixed to thereby obtain a silicone resin composition J.

Example 24

200 parts by weight of a glass frit (trade name: "VY0062M", made by Nippon Frit Co., Ltd.) with respect to 100 parts by weight of the solid content in the transparent resin composition solution G obtained in Synthesis Example 7 was added to the transparent resin composition solution G, and stirred and mixed to thereby obtain a silicone resin composition K.

Example 25

200 parts by weight of a glass frit (trade name: "VY0053L", made by Nippon Frit Co., Ltd.) with respect to 100 parts by weight of the solid content in the transparent resin composition solution G obtained in Synthesis Example 7 was added to the transparent resin composition solution G, and stirred and mixed to thereby obtain a silicone resin composition L.

Example 26

200 parts by weight of a glass frit (trade name: "VQ0026M", made by Nippon Frit Co., Ltd.) with respect to 100 parts by weight of the solid content in the transparent resin composition solution G obtained in Synthesis Example 7 was added to the transparent resin composition solution G, and stirred and mixed to thereby obtain a silicone resin composition M.

Example 27

200 parts by weight of a glass frit (trade name: "CY0019M", made by Nippon Frit Co., Ltd.) with respect to 100 parts by weight of the solid content in the transparent resin composition solution G obtained in Synthesis Example 7 was added to the transparent resin composition solution G, and stirred and mixed to thereby obtain a silicone resin composition N.

Example 28

450 parts by weight of an alumina particle (trade name: "AS-50", made by Showa Denko K.K.) with respect to 100 parts by weight of the solid content in the transparent resin composition solution G obtained in Synthesis Example 7 was added to the transparent resin composition solution G, and stirred and mixed to thereby obtain a silicone resin composition 0.

Example 29

180 parts by weight of an aluminum hydroxide particle (trade name: "HIGILITE H-10", made by Showa Denko K.K.) with respect to 100 parts by weight of the solid content in the transparent resin composition solution G obtained in Synthesis Example 7 was added to the transparent resin composition solution G, and stirred and mixed to thereby obtain a silicone resin composition P.

Example 30

150 parts by weight of a magnesium hydroxide particle (trade name: "Kisuma 5A", made by Kyowa Chemical Industry Co., Ltd.) with respect to 100 parts by weight of the solid content in the transparent resin composition solution G obtained in Synthesis Example 7 was added to the transparent resin composition solution G, and stirred and mixed to thereby obtain a silicone resin composition Q.

Example 31

90 parts by weight of an aluminum hydroxide particle (trade name: "HIGILITE H-10", made by Showa Denko K.K.) and 90 parts by weight of a magnesium hydroxide particle (trade name: "Kisuma 5A", made by Kyowa Chemical Industry Co., Ltd.) with respect to 100 parts by weight of the solid content in the transparent resin composition solution G obtained in Synthesis Example 7 were added to the transparent resin composition solution G, and stirred and mixed to thereby obtain a silicone resin composition R.

Example 32

150 parts by weight of a glass frit (trade name: "VY0053L", made by Nippon Frit Co., Ltd.) with respect to 100 parts by weight of the solid content in the transparent resin composition solution G obtained in Synthesis Example 7 was added to the transparent resin composition solution G, and stirred and mixed to thereby obtain a silicone resin composition S.

Example 33

300 parts by weight of a glass frit (trade name: "VY0053L", made by Nippon Frit Co., Ltd.) with respect to 100 parts by weight of the solid content in the transparent resin composition solution G obtained in Synthesis Example 7 was added to the transparent resin composition solution G, and stirred and mixed to thereby obtain a silicone resin composition T.

Example 34

450 parts by weight of a glass frit (trade name: "VY0053L", made by Nippon Frit Co., Ltd.) with respect to 100 parts by weight of the solid content in the transparent resin composition solution G obtained in Synthesis Example 7 was added to the transparent resin composition solution G, and stirred and mixed to thereby obtain a silicone resin composition U.

Example 35

200 parts by weight of a glass frit (trade name: "VY0053L", made by Nippon Frit Co., Ltd.) and 30 parts by weight of an aluminum hydroxide particle (trade name: "HIGILITE H-10", made by Showa Denko K.K.) with respect to 100 parts by weight of the solid content in the transparent resin composition solution G obtained in Synthesis Example 7 were added to the transparent resin composition solution G, and stirred and mixed to thereby obtain a silicone resin composition V.

Example 36

100 parts by weight of a glass frit (trade name: "VY0053L", made by Nippon Frit Co., Ltd.) and 100 parts by weight of an aluminum hydroxide particle (trade name: "HIGILITE H-10", made by Showa Denko K.K.) with respect to 100 parts by weight of the solid content in the transparent resin composition solution G obtained in Synthesis Example 7 were added to the transparent resin composition solution G, and stirred and mixed to thereby obtain a silicone resin composition W.

Example 37

200 parts by weight of a glass frit (trade name: "VY0053L", made by Nippon Frit Co., Ltd.) with respect to 100 parts by weight of the solid content in the transparent resin composition solution I obtained in Synthesis Example 9 was added to the transparent resin composition solution I, and stirred and mixed to thereby obtain a silicone resin composition X.

Example 38

200 parts by weight of a glass frit (trade name: "VY0053L", made by Nippon Frit Co., Ltd.) with respect to 100 parts by weight of the solid content in the transparent resin composition solution J obtained in Synthesis Example 10 was added to the transparent resin composition solution J, and stirred and mixed to thereby obtain a silicone resin composition Y.

Example 39

The silicone resin composition A obtained in Example 14 was concentrated up to a solid content concentration of 76 wt %, and thereafter applied on a polypropylene plate (thickness: 2,000 μm, trade name: "Kobe Polysheet Polypropylene Plate PP-N-AN", made by Shin-Kobe Electric Machinery Co., Ltd.) so that the thickness after drying became 90 μm by using an applicator made by Tester Sangyo Co., Ltd., thereafter dried under heating in a hot air circulation-type oven at 90° C. for 30 min and at 120° C. for 2 min to thereby obtain a flame-resistant composite member.

Example 40

A flame-resistant composite member was obtained by the similar operation as in Example 39, except for using the silicone resin composition B obtained in Example 15 in place of the silicone resin composition A obtained in Example 14.

Example 41

A flame-resistant composite member was obtained by the similar operation as in Example 39, except for using the silicone resin composition C obtained in Example 16 in place of the silicone resin composition A obtained in Example 14.

Example 42

A flame-resistant composite member was obtained by the similar operation as in Example 39, except for using the silicone resin composition D obtained in Example 17 in place of the silicone resin composition A obtained in Example 14.

Example 43

A flame-resistant composite member was obtained by the similar operation as in Example 39, except for using the silicone resin composition E obtained in Example 18 in place of the silicone resin composition A obtained in Example 14.

Example 44

A flame-resistant composite member was obtained by the similar operation as in Example 39, except for using the silicone resin composition F obtained in Example 19 in place of the silicone resin composition A obtained in Example 14.

Example 45

A flame-resistant composite member was obtained by the similar operation as in Example 39, except for using the silicone resin composition G obtained in Example 20 in place of the silicone resin composition A obtained in Example 14.

Example 46

A flame-resistant composite member was obtained by the similar operation as in Example 39, except for using the silicone resin composition D obtained in Example 17 in place of the silicone resin composition A obtained in Example 14, and using a polyethylene plate (thickness: 2,000 μm, trade name: "Kobe Polysheet Polyethylene Plate EL-N-AN", made by Shin-Kobe Electric Machinery Co., Ltd.) in place of the polypropylene plate.

Example 47

A flame-resistant composite member was obtained by the similar operation as in Example 39, except for using the silicone resin composition E obtained in Example 18 in place of the silicone resin composition A obtained in Example 14, and using a polyethylene plate (thickness: 2,000 μm, trade name: "Kobe Polysheet Polyethylene Plate EL-N-AN", made by Shin-Kobe Electric Machinery Co., Ltd.) in place of the polypropylene plate.

Example 48

A flame-resistant composite member was obtained by the similar operation as in Example 39, except for using the silicone resin composition H obtained in Example 21 in place of the silicone resin composition A obtained in Example 14.

Example 49

A flame-resistant composite member was obtained by the similar operation as in Example 39, except for using the silicone resin composition I obtained in Example 22 in place of the silicone resin composition A obtained in Example 14.

Example 50

The silicone resin composition J obtained in Example 23 was concentrated until the solid content concentration of the transparent resin composition solution therein became 76 wt %, and thereafter applied on a polycarbonate plate (thickness: 2,000 μm, trade name: "PC1600", made by Takiron Co., Ltd.) so that the thickness after drying became 200 μm by using an applicator made by Tester Sangyo Co., Ltd., thereafter dried under heating in a hot air circulation-type oven at 90° C. for 30 min and at 120° C. for 10 min to thereby obtain a flame-resistant composite member.

Example 51

A flame-resistant composite member was obtained by the similar operation as in Example 50, except for using the silicone resin composition K obtained in Example 24 in place of the silicone resin composition J obtained in Example 23.

Example 52

A flame-resistant composite member was obtained by the similar operation as in Example 50, except for using the silicone resin composition L obtained in Example 25 in place of the silicone resin composition J obtained in Example 23.

Example 53

A flame-resistant composite member was obtained by the similar operation as in Example 50, except for using the silicone resin composition M obtained in Example 26 in place of the silicone resin composition J obtained in Example 23.

Example 54

A flame-resistant composite member was obtained by the similar operation as in Example 50, except for using the silicone resin composition N obtained in Example 27 in place of the silicone resin composition J obtained in Example 23.

Example 55

A flame-resistant composite member was obtained by the similar operation as in Example 50, except for using the silicone resin composition 0 obtained in Example 28 in place of the silicone resin composition J obtained in Example 23.

Example 56

The silicone resin composition P obtained in Example 29 was concentrated until the solid content concentration of the transparent resin composition solution therein became 76 wt %, and thereafter applied on a polycarbonate plate (thickness: 1,500 μm, trade name: "PC1600", made by Takiron Co., Ltd.) so that the thickness after drying became 200 μm by using an applicator made by Tester Sangyo Co., Ltd., thereafter dried under heating in a hot air circulation-type oven at 90° C. for 30 min and at 120° C. for 10 min to thereby obtain a flame-resistant composite member.

Example 57

A flame-resistant composite member was obtained by the similar operation as in Example 56, except for using the silicone resin composition Q obtained in Example 30 in place of the silicone resin composition P obtained in Example 29.

Example 58

A flame-resistant composite member was obtained by the similar operation as in Example 56, except for using the silicone resin composition R obtained in Example 31 in place of the silicone resin composition P obtained in Example 29.

Example 59

A flame-resistant composite member was obtained by the similar operation as in Example 56, except for using the silicone resin composition L obtained in Example 25 in place of the silicone resin composition P obtained in Example 29.

Example 60

A flame-resistant composite member was obtained by the similar operation as in Example 56, except for using the silicone resin composition L obtained in Example 25 in place of the silicone resin composition P obtained in Example 29, and applying so that the thickness after drying became 240 μm.

Example 61

A flame-resistant composite member was obtained by the similar operation as in Example 56, except for using the silicone resin composition L obtained in Example 25 in place of the silicone resin composition P obtained in Example 29, and applying so that the thickness after drying became 350 μm.

Example 62

A flame-resistant composite member was obtained by the similar operation as in Example 56, except for using the silicone resin composition S obtained in Example 32 in place of the silicone resin composition P obtained in Example 29, and applying so that the thickness after drying became 300 μm.

Example 63

A flame-resistant composite member was obtained by the similar operation as in Example 56, except for using the silicone resin composition T obtained in Example 33 in place of the silicone resin composition P obtained in Example 29, and applying so that the thickness after drying became 300 μm.

Example 64

A flame-resistant composite member was obtained by the similar operation as in Example 56, except for using the silicone resin composition T obtained in Example 33 in place of the silicone resin composition P obtained in Example 29, and applying so that the thickness after drying became 400 μm.

Example 65

A flame-resistant composite member was obtained by the similar operation as in Example 56, except for using the silicone resin composition U obtained in Example 34 in place of the silicone resin composition P obtained in Example 29, and applying so that the thickness after drying became 300 µm.

Example 66

A flame-resistant composite member was obtained by the similar operation as in Example 56, except for using the silicone resin composition U obtained in Example 34 in place of the silicone resin composition P obtained in Example 29, and applying so that the thickness after drying became 500 µm.

Example 67

A flame-resistant composite member was obtained by the similar operation as in Example 56, except for using the silicone resin composition V obtained in Example 35 in place of the silicone resin composition P obtained in Example 29, and applying so that the thickness after drying became 400 µm.

Example 68

A flame-resistant composite member was obtained by the similar operation as in Example 56, except for using the silicone resin composition W obtained in Example 36 in place of the silicone resin composition P obtained in Example 29.

Example 69

A flame-resistant composite member was obtained by the similar operation as in Example 56, except for using the silicone resin composition X obtained in Example 37 in place of the silicone resin composition P obtained in Example 29, and applying so that the thickness after drying became 340 µm.

Example 70

A flame-resistant composite member was obtained by the similar operation as in Example 56, except for using the silicone resin composition Y obtained in Example 38 in place of the silicone resin composition P obtained in Example 29, and applying so that the thickness after drying became 340 µm.

Example 71

The silicone resin composition L obtained in Example 25 was concentrated until the solid content concentration of the transparent resin composition solution therein became 76 wt %, and thereafter applied on a polycarbonate plate (thickness: 1,000 µm, trade name: "PC1600", made by Takiron Co., Ltd.) so that the thickness after drying became 350 µm by using an applicator made by Tester Sangyo Co., Ltd., thereafter dried under heating in a hot air circulation-type oven at 90° C. for 30 min and at 120° C. for 10 min to thereby obtain a flame-resistant composite member.

Example 72

A flame-resistant composite member was obtained by the similar operation as in Example 71, except for using the silicone resin composition X obtained in Example 37 in place of the silicone resin composition L obtained in Example 25, and applying so that the thickness after drying became 360 µm.

Example 73

A flame-resistant composite member was obtained by the similar operation as in Example 71, except for using the silicone resin composition Y obtained in Example 38 in place of the silicone resin composition L obtained in Example 25, and applying so that the thickness after drying became 390 µm.

Comparative Example 10

A polypropylene plate (thickness: 2,000 µm, trade name: "Kobe Polysheet Polypropylene Plate PP-N-AN", made by Shin-Kobe Electric Machinery Co., Ltd.) as a single material was used for evaluation.

Comparative Example 11

A polyethylene plate (thickness: 2,000 µm, trade name: "Kobe Polysheet Polyethylene Plate EL-N-AN", made by Shin-Kobe Electric Machinery Co., Ltd.) as a single material was used for evaluation.

Comparative Example 12

A polycarbonate plate (thickness: 2,000 µm, trade name: "PC1600", made by Takiron Co., Ltd.) as a single material was used for evaluation.

Comparative Example 13

A polycarbonate plate (thickness: 1,500 µm, trade name: "PC1600", made by Takiron Co., Ltd.) as a single material was used for evaluation.

Comparative Example 14

A polycarbonate plate (thickness: 1,000 µm, trade name: "PC1600", made by Takiron Co., Ltd.) as a single material was used for evaluation.

Synthesis Example 2-1

50 g of a colloidal silica solution (trade name: Snowtex OS, made by Nissan Chemical Industries, Ltd., solid content concentration: 20%) having an average particle diameter of 8 to 11 nm, and 83 g of 2-propanol were added to a vessel equipped with a stirrer, a reflux cooler and a nitrogen introducing tube. A concentrated nitric acid was added thereto to regulate the acidity (pH) of the liquid in the range of 2 to 4. Then, the liquid was heated to 70° C., and thereafter, a liquid in which 25 g of a silsesquioxane compound (trade name: X-40-9225, made by Shin-Etsu Chemical Co., Ltd., methoxy content: 24%) having a reactive methoxysilyl group at the molecular terminal was dissolved in 25 g of 2-propanol was dropped over 75 min by using a dropping funnel to thereby allow the silsesquioxane compound and the colloidal silica particle surface to react. Then, a liquid in which 75 g of a polysiloxane compound (trade name: X-40-9246, made by Shin-Etsu Chemical Co., Ltd., methoxy content: 12%) derived from a trifunctional alkoxysilane and a bifunctional alkoxysilane having reactive methoxysilyl groups at the molecular terminals was dissolved in 75 g of 2-propanol was dropped over 225 min to be allowed to react with the silsesquioxane compound on the colloidal silica. The resultant was stirred under heating at 70° C. for 1 hour, and thereafter cooled to room temperature (25° C.) to thereby obtain a liquid transparent resin composition solution 2-A.

Synthesis Example 2-2

50 g of a colloidal silica solution (trade name: Snowtex OS, made by Nissan Chemical Industries, Ltd., solid content concentration: 20%) having an average particle diameter of 8 to 11 nm, and 83 g of 2-propanol were added to a vessel equipped with a stirrer, a reflux cooler and a nitrogen introducing tube. A concentrated nitric acid was added thereto to regulate the acidity (pH) of the liquid in the range of 2 to 4. Then, the liquid was heated to 70° C., and thereafter, a liquid in which 10 g of a silsesquioxane compound (trade name: X-40-9225, made by Shin-Etsu Chemical Co., Ltd., methoxy content: 24%) having a reactive methoxysilyl group at the molecular terminal was dissolved in 10 g of 2-propanol was dropped over 30 min by using a dropping funnel to thereby allow the silsesquioxane compound and the colloidal silica particle surface to react.

Then, a liquid in which 90 g of a polysiloxane compound (trade name: X-40-9246, made by Shin-Etsu Chemical Co., Ltd., methoxy content: 12%) derived from a trifunctional alkoxysilane and a bifunctional alkoxysilane having reactive methoxysilyl groups at the molecular terminals was dissolved in 90 g of 2-propanol was dropped over 270 min to be allowed to react with the silsesquioxane compound on the colloidal silica. The resultant was stirred under heating at 70° C. for 1 hour, and thereafter cooled to room temperature (25° C.) to thereby obtain a liquid transparent resin composition solution 2-B.

Synthesis Example 2-3

50 g of a colloidal silica solution (trade name: Snowtex OS, made by Nissan Chemical Industries, Ltd., solid content concentration: 20%) having an average particle diameter of 8 to 11 nm, and 83 g of 2-propanol were added to a vessel equipped with a stirrer, a reflux cooler and a nitrogen introducing tube. A concentrated nitric acid was added thereto to regulate the acidity (pH) of the liquid in the range of 2 to 4. Then, the liquid was heated to 70° C., and thereafter, a liquid in which 5 g of a silsesquioxane compound (trade name: X-40-9225, made by Shin-Etsu Chemical Co., Ltd., methoxy content: 24%) having a reactive methoxysilyl group at the molecular terminal was dissolved in 5 g of 2-propanol was dropped over 15 min by using a dropping funnel to thereby allow the silsesquioxane compound and the colloidal silica particle surface to react.

Then, a liquid in which 95 g of a polysiloxane compound (trade name: X-40-9246, made by Shin-Etsu Chemical Co., Ltd., methoxy content: 12%) derived from a trifunctional alkoxysilane and a bifunctional alkoxysilane having reactive methoxysilyl groups at the molecular terminals was dissolved in 95 g of 2-propanol was dropped over 285 min to be allowed to react with the silsesquioxane compound on the colloidal silica. The resultant was stirred under heating at 70° C. for 1 hour, and thereafter cooled to room temperature (25° C.) to thereby obtain a liquid transparent resin composition solution 2-C.

Synthesis Example 2-4

A transparent resin composition solution 2-D was obtained by using the similar experimental apparatus as in Synthesis Example 2-1 and by the similar process as in Synthesis Example 2-2, except for altering the amount of the colloidal silica solution (trade name: Snowtex OS, made by Nissan Chemical Industries, Ltd., solid content concentration: 20%) to 75 g, and the amount of 2-propanol to dissolve this to 125 g.

Example 2-1

200 parts by weight of a glass frit (trade name: "VY0053L", made by Nippon Frit Co., Ltd.) and 100 parts by weight of 2-methoxyethanol (made by Wako Pure Chemical Industries, Ltd.) with respect to 100 parts by weight of the solid content in the transparent resin composition solution 2-A obtained in Synthesis Example 2-1 were added to the transparent resin composition solution 2-A, and stirred and mixed to thereby obtain a silicone resin composition 2-A.

Example 2-2

200 parts by weight of a glass frit (trade name: "VY0053M", made by Nippon Frit Co., Ltd.) and 100 parts by weight of 2-methoxyethanol (made by Wako Pure Chemical Industries, Ltd.) with respect to 100 parts by weight of the solid content in the transparent resin composition solution 2-B obtained in Synthesis Example 2-2 were added to the transparent resin composition solution 2-B, and stirred and mixed to thereby obtain a silicone resin composition 2-B.

Example 2-3

200 parts by weight of a glass frit (trade name: "VY0053M", made by Nippon Frit Co., Ltd.) and 100 parts by weight of 2-methoxyethanol (made by Wako Pure Chemical Industries, Ltd.) with respect to 100 parts by weight of the solid content in the transparent resin composition solution 2-C obtained in Synthesis Example 2-3 were added to the transparent resin composition solution 2-C, and stirred and mixed to thereby obtain a silicone resin composition 2-C.

Example 2-4

200 parts by weight of a glass frit (trade name: "VY0053L", made by Nippon Frit Co., Ltd.) and 100 parts by weight of 2-methoxyethanol (made by Wako Pure Chemical Industries, Ltd.) with respect to 100 parts by weight of the solid content in the transparent resin composition solution 2-D obtained in Synthesis Example 2-4 were added to the transparent resin composition solution 2-D, and stirred and mixed to thereby obtain a silicone resin composition 2-D.

Example 2-5

200 parts by weight of a glass frit (trade name: "VY0053M", made by Nippon Frit Co., Ltd.) and 100 parts by weight of 2-methoxyethanol (made by Wako Pure Chemical Industries, Ltd.) with respect to 100 parts by weight of the solid content in the transparent resin composition solution 2-A obtained in Synthesis Example 2-1 were added to the transparent resin composition solution 2-A, and stirred and mixed to thereby obtain a silicone resin composition 2-E.

Example 2-6

200 parts by weight of a glass frit (trade name: "CY0019M", made by Nippon Frit Co., Ltd.) and 100 parts by weight of 2-methoxyethanol (made by Wako Pure Chemical Industries, Ltd.) with respect to 100 parts by weight of the solid content in the transparent resin composition solution 2-A obtained in Synthesis Example 2-1 were added to the transparent resin composition solution 2-A, and stirred and mixed to thereby obtain a silicone resin composition 2-F.

Example 2-7

200 parts by weight of a glass frit (trade name: "BS-1", made by OKAMOTO GLASS Co., Ltd.) and 100 parts by weight of 2-methoxyethanol (made by Wako Pure Chemical Industries, Ltd.) with respect to 100 parts by weight of the solid content in the transparent resin composition solution 2-A obtained in Synthesis Example 2-1 were added to the transparent resin composition solution 2-A, and stirred and mixed to thereby obtain a silicone resin composition 2-G.

Example 2-8

100 parts by weight of a glass frit (trade name: "VY0053M", made by Nippon Frit Co., Ltd.) and 100 parts by weight of 2-methoxyethanol (made by Wako Pure Chemical Industries, Ltd.) with respect to 100 parts by weight of the solid content in the transparent resin composition solution 2-A obtained in Synthesis Example 2-1 were added to the transparent resin composition solution 2-A, and stirred and mixed to thereby obtain a silicone resin composition 2-H.

Example 2-9

150 parts by weight of a glass frit (trade name: "VY0053M", made by Nippon Frit Co., Ltd.) and 100 parts by weight of 2-methoxyethanol (made by Wako Pure Chemical Industries, Ltd.) with respect to 100 parts by weight of the solid content in the transparent resin composition solution 2-A obtained in Synthesis Example 2-1 were added to the transparent resin composition solution 2-A, and stirred and mixed to thereby obtain a silicone resin composition 2-I.

Example 2-10

267 parts by weight of a glass frit (trade name: "VY0053M", made by Nippon Frit Co., Ltd.) and 100 parts by weight of 2-methoxyethanol (made by Wako Pure Chemical Industries, Ltd.) with respect to 100 parts by weight of the solid content in the transparent resin composition solution 2-A obtained in Synthesis Example 2-1 were added to the transparent resin composition solution 2-A, and stirred and mixed to thereby obtain a silicone resin composition 2-J.

Example 2-11

The silicone resin composition 2-A obtained in Example 2-1 was concentrated until the solid content concentration of the transparent resin composition solution therein became 75 wt %, and thereafter was applied on a polycarbonate plate (thickness: 2,000 μm, trade name: "PC1600", made by Takiron Co., Ltd.), which had been subjected to a primer treatment with aminopropyltrimethoxysilane (trade name: "SILQUEST A-1110 SILANE", made by Momentive Performance Materials Inc.) by the similar method as in Primer Treatment Example 3-1 of a base material described later, so that the thickness after drying became 200 μm by using an applicator made by Tester Sangyo Co., Ltd., thereafter dried under heating in a hot air circulation-type oven at 90° C. for 60 min, at 130° C. for 15 min and at 170° C. for 60 min to thereby obtain a flame-resistant composite member.

Example 2-12

A flame-resistant composite member was obtained by the similar operation as in Example 2-11, except for using the silicone resin composition 2-s obtained in Example 2-2 in place of the silicone resin composition 2-A obtained in Example 2-1.

Example 2-13

A flame-resistant composite member was obtained by the similar operation as in Example 2-11, except for using the silicone resin composition 2-C obtained in Example 2-3 in place of the silicone resin composition 2-A obtained in Example 2-1.

Example 2-14

The silicone resin composition 2-D obtained in Example 2-4 was concentrated until the solid content concentration of the transparent resin composition solution therein became 75 wt %, and thereafter was applied on a polycarbonate plate (thickness: 2,000 μm, trade name: "PC1600", made by Takiron Co., Ltd.), which had been subjected to a primer treatment with aminopropyltrimethoxysilane (trade name: "SILQUEST A-1110 SILANE", made by Momentive Performance Materials Inc.) by the similar method as in Primer Treatment Example 3-1 of a base material described later, so that the thickness after drying became 370 μm by using an applicator made by Tester Sangyo Co., Ltd., thereafter dried under heating in a hot air circulation-type oven at 90° C. for 40 min, at 130° C. for 120 min and at 170° C. for 5 min to thereby obtain a flame-resistant composite member.

Example 2-15

A flame-resistant composite member was obtained by the similar operation as in Example 2-11, except for using the silicone resin composition 2-E obtained in Example 2-5 in place of the silicone resin composition 2-A obtained in Example 2-1, and applying so that the thickness after drying became 220 μm.

Example 2-16

A flame-resistant composite member was obtained by the similar operation as in Example 2-11, except for using the silicone resin composition 2-F obtained in Example 2-6 in place of the silicone resin composition 2-A obtained in Example 2-1, and applying so that the thickness after drying became 130 μm.

Example 2-17

A flame-resistant composite member was obtained by the similar operation as in Example 2-11, except for using the silicone resin composition 2-G obtained in Example 2-7 in place of the silicone resin composition 2-A obtained in Example 2-1, and applying so that the thickness after drying became 170 μm.

Example 2-18

A flame-resistant composite member was obtained by the similar operation as in Example 2-11, except for using the silicone resin composition 2-H obtained in Example 2-8 in place of the silicone resin composition 2-A obtained in Example 2-1.

Example 2-19

The silicone resin composition 2-E obtained in Example 2-5 was concentrated until the solid content concentration of the transparent resin composition solution therein became 75 wt %, and thereafter was applied on a polycarbonate plate (thickness: 1,500 μm, trade name: "Panlite Sheet PC-1151", made by Teijin Chemicals Ltd.), which had been subjected to a primer treatment with aminopropyltrimethoxysilane (trade name: "SILQUEST A-1110 SILANE", made by Momentive Performance Materials Inc.) by the similar method as in Primer Treatment Example 3-1 of a base material described later, so that the thickness after drying became 230 μm by using an applicator made by Tester Sangyo Co., Ltd., thereafter dried under heating in a hot air circulation-type oven at 90° C. for 60 min, at 130° C. for 15 min and at 170° C. for 60 min to thereby obtain a flame-resistant composite member.

Example 2-20

A flame-resistant composite member was obtained by the similar operation as in Example 2-19, except for using the silicone resin composition 2-I obtained in Example 2-12 in place of the silicone resin composition 2-E obtained in Example 2-5.

Example 2-21

A flame-resistant composite member was obtained by the similar operation as in Example 2-19, except for using the silicone resin composition 2-J obtained in Example 2-13 in place of the silicone resin composition 2-E obtained in Example 2-5.

Example 2-22

A flame-resistant composite member was obtained by the similar operation as in Example 2-19, except for applying so that the thickness after drying became 180 μm.

Example 2-23

A flame-resistant composite member was obtained by the similar operation as in Example 2-19, except for applying so that the thickness after drying became 300 μm.

Example 2-24

A flame-resistant composite member was obtained by the similar operation as in Example 2-19, except for applying so that the thickness after drying became 250 μm, and using a polycarbonate plate (thickness: 1,200 μm, trade name: "Panlite Sheet PC-1151", made by Teijin Chemicals Ltd.) in place of the polycarbonate plate (thickness: 1,500 μm, trade name: "Panlite Sheet PC-1151", made by Teijin Chemicals Ltd.).

Comparative Example 2-1

A polycarbonate plate (thickness: 1,200 μm, trade name: "Panlite Sheet PC-1151", made by Teijin Chemicals Ltd.) as a single material was used for evaluation.

Synthesis Example 3-1

50 g of a colloidal silica solution (trade name: Snowtex OS, made by Nissan Chemical Industries, Ltd., solid content concentration: 20%) having an average particle diameter of 8 to 11 nm, and 84 g of 2-propanol were added to a vessel equipped with a stirrer, a reflux cooler and a nitrogen introducing tube. A concentrated nitric acid was added thereto to regulate the acidity (pH) of the liquid in the range of 2 to 4. Then, the liquid was heated to 70° C., and thereafter, a liquid in which 25 g of a silsesquioxane compound (trade name: X-40-9225, made by Shin-Etsu Chemical Co., Ltd., methoxy content: 24%) having a reactive methoxysilyl group at the molecular terminal was dissolved in 25 g of 2-propanol was dropped over 1 hour by using a dropping funnel to thereby allow the silsesquioxane compound and the colloidal silica particle surface to react.

Then, a liquid in which 75 g of a polysiloxane compound (trade name: X-40-9246, made by Shin-Etsu Chemical Co., Ltd., methoxy content: 12%) derived from a trifunctional alkoxysilane and a bifunctional alkoxysilane having reactive methoxysilyl groups at the molecular terminals was dissolved in 75 g of 2-propanol was dropped over 3 hours to be allowed to react with the silsesquioxane compound on the colloidal silica. The resultant was stirred under heating at 70° C. for 1 hour, and thereafter cooled to room temperature (25° C.) to thereby obtain a liquid transparent resin composition solution 3-A.

Primer Treatment Example 3-1 of a Base Material 77 parts by weight of 2-propanol and 20 parts by weight of butanol were stirred and mixed with 3 parts by weight of a primer composition (trade name: "A-1110", made by Momentive Performance Materials Inc.) to thereby obtain a primer solution 3-A.

The primer solution 3-A was applied on a flame-resistant polycarbonate plate (thickness: 1,500 μm, trade name: "N-7S", made by Mitsubishi Gas Chemical Co., Ltd.) so that the thickness after drying became 2 μm by using a Meyer bar, and thereafter dried under heating by a hot air circulation-type oven at 120° C. for 120 min to thereby obtain a flame-resistant polycarbonate plate 3-A having been subjected to a primer treatment.

Primer Treatment Example 3-2 of a Base Material

A flame-resistant polycarbonate plate 3-B was obtained by the similar operation as in Primer Treatment Example 3-1 of a base material, except for using a flame-resistant polycarbonate plate (thickness: 1,500 μm, trade name: "NF-2000V", made by Mitsubishi Gas Chemical Co., Ltd.) in place of the flame-resistant polycarbonate plate (thickness: 1,500 μm, trade name: "N-7S", made by Mitsubishi Gas Chemical Co., Ltd.).

Primer Treatment Example 3-3 of a Base Material

A flame-resistant polycarbonate plate 3-C was obtained by the similar operation as in Primer Treatment Example 3-1 of a base material, except for using a flame-resistant polycarbonate plate (thickness: 1,500 μm, trade name: "PZ-600", made by Takiron Co., Ltd.) in place of the flame-resistant polycarbonate plate (thickness: 1,500 µm, trade name: "N-7S", made by Mitsubishi Gas Chemical Co., Ltd.).

Example 3-1

200 parts by weight of a glass frit (trade name: "VY0053L,", made by Nippon Frit Co., Ltd.) with respect to 100 parts by weight of the solid content in the transparent resin composition solution 3-A obtained in Synthesis Example 3-1 was added to the transparent resin composition solution 3-A and stirred and mixed to thereby obtain a silicone resin composition 3-A.

Example 3-2

The silicone resin composition 3-A obtained in Example 3-1 was concentrated until the solid content concentration of the transparent resin composition solution therein became 75 wt %, and thereafter applied on the primer-treated surface of the flame-resistant polycarbonate plate 3-A so that the thickness after drying became 350 µm by using an applicator made by Tester Sangyo Co., Ltd., and thereafter dried under heating in a hot air circulation-type oven at 90° C. for 60 min and at 130° C. for 120 min to thereby obtain a flame-resistant composite member.

Example 3-3

A flame-resistant composite member was obtained by the similar operation as in Example 3-2, except for using the flame-resistant polycarbonate plate 3-B in place of the flame-resistant polycarbonate plate 3-A.

Example 3-4

A flame-resistant composite member was obtained by the similar operation as in Example 3-2, except for using the flame-resistant polycarbonate plate 3-C in place of the flame-resistant polycarbonate plate 3-A.

Comparative Example 3-1

A flame-resistant polycarbonate plate (thickness: 1,500 µm, trade name: "N-7S", made by Mitsubishi Gas Chemical Co., Ltd.) as a single material was used for evaluation.

Comparative Example 3-2

A flame-resistant polycarbonate plate (thickness: 1,500 µm, trade name: "NF-2000V", made by Mitsubishi Gas Chemical Co., Ltd.) as a single material was used for evaluation.

Comparative Example 3-3

A flame-resistant polycarbonate plate (thickness: 1,500 µm, trade name: "PZ-600", made by Takiron Co., Ltd.) as a single material was used for evaluation.

Synthesis Example 4-1

50 g of a colloidal silica solution (trade name: Snowtex OS, made by Nissan Chemical Industries, Ltd., solid content concentration: 20%) having an average particle diameter of 8 to 11 nm, and 83 g of 2-propanol were added to a vessel equipped with a stirrer, a reflux cooler and a nitrogen introducing tube. A concentrated nitric acid was added thereto to regulate the acidity (pH) of the liquid in the range of 2 to 4. Then, the liquid was heated to 65° C., and thereafter, a liquid in which 25 g of a silsesquioxane compound (trade name: X-40-9225, made by Shin-Etsu Chemical Co., Ltd., methoxy content: 24%) having a reactive methoxysilyl group at the molecular terminal was dissolved in 25 g of 2-propanol was dropped over 75 min by using a dropping funnel to thereby allow the silsesquioxane compound and the colloidal silica particle surface to react. Then, a liquid in which 75 g of a polysiloxane compound (trade name: X-40-9246, made by Shin-Etsu Chemical Co., Ltd., methoxy content: 12%) derived from a trifunctional alkoxysilane and a bifunctional alkoxysilane having reactive methoxysilyl groups at the molecular terminals was dissolved in 75 g of 2-propanol was dropped over 230 min to be allowed to react with the silsesquioxane compound on the colloidal silica. The resultant was stirred under heating at 65° C. for 1 hour, and thereafter cooled to room temperature (25° C.) to thereby obtain a liquid transparent resin composition solution 4-A.

Synthesis Example 4-2

200 parts by weight of a glass frit (trade name: "VY0053M", made by Nippon Frit Co., Ltd.) with respect to 100 parts by weight of the solid content in the transparent resin composition solution obtained in Synthesis Example 4-1 was added to the transparent resin composition solution 4-A, and stirred and mixed to thereby obtain a silicone resin composition 4-A.

Synthesis Example 4-3

The silicone resin composition 4-A obtained in Synthesis Example 4-2 was concentrated up to a solid content concentration of 75 wt %, and thereafter applied on a polycarbonate plate (thickness: 2,000 trade name: "PC1600", made by Takiron Co., Ltd.) so that the thickness after drying became 450 µm by using an applicator made by Tester Sangyo Co., Ltd., and thereafter dried under heating in a hot air circulation-type oven at 90° C. for 60 min, at 130° C. for 15 min and at 170° C. for 60 min to thereby obtain a flame-resistant composite member 4-A.

Example 4-1

A mold-releasable silicone composite coating material (trade name: "Everhard No100", made by Ohashi Chemical Industries Ltd.) was applied on the flame-resistant composite member 4-A obtained in Synthesis Example 4-3 so that the thickness after drying became 50 µm, and dried at 130° C. for 1 min to thereby obtain a scratch-resistant flame-resistant composite member 4-A.

Example 4-2

A silicone hard coat agent (trade name: "KP-854", made by Shin-Etsu Chemical Co., Ltd.) was applied on the flame-resistant composite member 4-A obtained in Synthesis Example 4-3 so that the thickness after drying became 10 µm, and dried at 130° C. for 1 min to thereby obtain a scratch-resistant flame-resistant composite member 4-B.

<Evaluations>

For the flame-resistant composite members and the like obtained in Examples and Comparative Examples, the following evaluations were carried out. The results are shown in Tables 1 to 5.

(Combustion Test)

Figure 2:
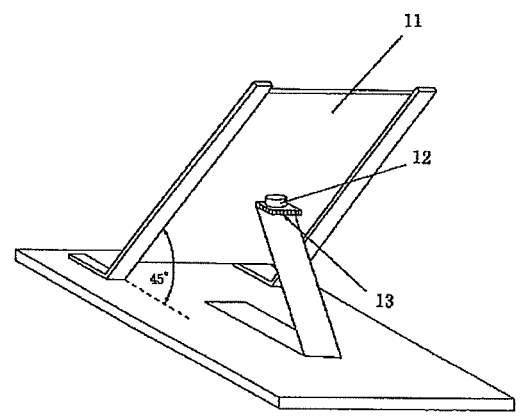
FIG. 2 is a perspective diagram of a combustion test apparatus used in combustion tests in Examples.

A combustion test was carried out according to the combustion test (for a general material: the 45° ethyl alcohol test of a railway rolling stock nonmetal material) of the Japan Railway Rolling Stock & Machinery Association by using a combustion test apparatus shown in FIG. 2. In FIG. 2, reference numeral 11 denotes a test specimen (182 mm×257 mm); reference numeral 12, an alcohol vessel (made of iron, 17.5ϕ×7.1, 0.8 t); and reference numeral 13, a vessel receiving platform (made of a cork or the like having a low heat conductivity). The distance from the center of the test specimen lower surface to the vessel bottom surface was 25.4 mm (1 inch).

The flame-resistant composite member (in Comparative Examples, the plastic single material) fabricated in the above, as shown in FIG. 2, was held at an inclination of 45'; the fuel vessel (alcohol vessel) 12 was mounted on the platform (vessel receiving platform) 13 of a cork so that the center of the bottom of the fuel vessel 12 came at a position of 25.4 mm vertically under the center of the lower surface of the test specimen; and 0.5 cc of ethyl alcohol was put in the fuel vessel 12, and ignited, and left for about 2 min until the fuel burned up completely. The presence/absence of ignition, carbonization, afterflame, penetration and melt dripping of the flame-resistant composite member (in Comparative Examples, the plastic single material) was visually observed, and evaluated according to the following criteria.

<Ignition/Carbonization/Afterflame>

⊚ID: No ignition or carbonization occurred during ethanol burning.

○: Ignition and carbonization occurred during ethanol burning, but no fire spreading occurred, and fire extinction occurred during ethanol burning.

Δ: Ignition occurred after the lapse of 1 min of ethanol burning, and fire spreading occurred and burning occurred even after ethanol burning, or holes opened in the test specimen.

X: Ignition occurred within 1 min of ethanol burning, and fire spreading occurred and burning occurred even after ethanol burning, or holes opened in the test specimen.

<Penetration/Melt Dripping>

○: No penetration or melt dripping occurred.

Δ: Penetration or melt dripping occurred after the lapse of 1 min of ethanol burning.

X: Penetration or melt dripping occurred within 1 min of ethanol burning.

(Cone Calorimeter Test)

Figure 3:
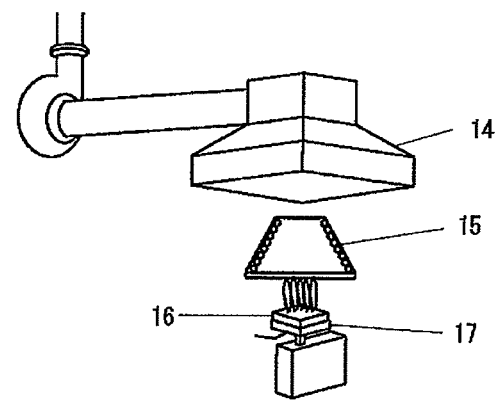
FIG. 3 is a schematic diagram of a combustion test apparatus used in cone calorimeter tests in Examples.

A planar square-shaped test piece whose side was 100 mm was cut out, and, as shown in FIG. 3, was burned by irradiation for 10 min of heat rays of 50 kW/m$^2$ by using a cone calorimeter by a method according to ISO 5660-1: 2002. In FIG. 3, reference numeral 14 denotes an exhaust hood; reference numeral 15, a cone-type heater; reference numeral 16, a test specimen material; and reference numeral 17, a test specimen material holder. The combustion determination was carried out using a total amount of heat generated (MJ/m$^2$), a maximum heat generation rate (kW/m$^2$) and an ignition time (sec) measured during the test time. With respect to the ignition time (sec), the case where any flame was present for not less than 10 sec after any flame from a test piece was recognized was regarded as an ignition, and a time from the test initiation until the ignition was first recognized was defined as the ignition time. In the combustion tests for Examples 2-11 to 2-24, Comparative Example 2-1, Examples 3-2 to 3-5 and Comparative Examples 3-1 to 3-4, a wire grid was installed on the surface of each test specimen material.

Determination Criteria (1) The total amount of heat generated for 10 min

○ The total amount of heat generated was not more than 30 MJ/m$^2$.

Δ: The total amount of heat generated was more than 30 MJ/m$^2$ and less than 45 MJ/m$^2$.

X: The total amount of heat generated was not less than 45 MJ/m$^2$.

(2) The maximum heat generation rate for 10 min

○: The maximum heat generation rate was not more than 300 kW/m$^2$.

Δ: The maximum heat generation rate was more than 300 kW/m$^2$ and less than 600 kW/m$^2$.

X: The maximum heat generation rate was not less than 600 kW/m$^2$.

(3) The ignition time

○: The ignition time was not less than 60 sec.

X: The ignition time was less than 60 sec.

(Scratch Resistance Test)

The scratch resistance of the scratch-resistant flame-resistant composite members of Examples was evaluated as follows. A steel wool #0000 was uniformly attached on the smooth cross-section of a cylinder of 25 mm in diameter, and the cylinder was pressed on the surface of the flame-resistant composite member sample under the condition of a load of 400 g. The cylinder having the steel wool attached thereon was set at about 100 mm per second in the velocity thereof, and reciprocated 10 times. Then, after the reciprocation, it was visually checked that no scratch of not less than 10 μm in width was generated on the surface of the sample, and the determination was carried out according to the following criteria.

A: There was no scratch at all.

B: There were fine scratches, but the effect on the visibility was small.

C: There were clearly scratches, and the visibility was impaired.

TABLE 1

| | Railway Rolling Stock Material Combustion Test Combustion Test | |
|---|---|---|
| | Ignition/Carbonization/Afterflame | Penetration/Melt dripping |
| Example 1 | ⊚ | ○ |
| Example 2 | ○ | ○ |
| Example 3 | ○ | ○ |
| Example 4 | ○ | ○ |
| Example 5 | ○ | ○ |
| Example 6 | ○ | ○ |
| Example 7 | Δ | Δ |
| Example 8 | Δ | Δ |
| Example 9 | Δ | Δ |
| Example 10 | ⊚ | ○ |
| Example 11 | ⊚ | ○ |
| Example 12 | ⊚ | ○ |
| Example 13 | ⊚ | ○ |
| Comparative Example 1 | X | X |
| Comparative Example 2 | X | X |
| Comparative Example 3 | X | X |
| Comparative Example 4 | X | X |
| Comparative Example 5 | X | X |

TABLE 1-continued

| | Railway Rolling Stock Material Combustion Test Combustion Test | |
|---|---|---|
| | Ignition/Carbonization/Afterflame | Penetration/Melt dripping |
| Comparative Example 6 | X | X |
| Comparative Example 7 | X | X |
| Comparative Example 8 | X | X |
| Comparative Example 9 | X | X |

TABLE 2

| | Railway Rolling Stock Material Combustion Test | | | | | | | |
|---|---|---|---|---|---|---|---|---|
| | Combustion Test | | Cone Calorimeter Test | | | | | |
| | Ignition/Carbonization/Afterflame | Penetration/Melt dripping | Total Amount of Heat Generated (MJ/m$^2$) | | Maximum Heat Generation Rate (kW/m$^2$) | | Ignition Time (sec) | |
| Example 39 | ◎ | ○ | | | | | | |
| Example 40 | ◎ | ○ | | | | | | |
| Example 41 | ◎ | ○ | | | | | | |
| Example 42 | ◎ | ○ | | | | | | |
| Example 43 | ◎ | ○ | | | | | | |
| Example 44 | ◎ | ○ | | | | | | |
| Example 45 | ◎ | ○ | | | | | | |
| Example 46 | ◎ | ○ | | | | | | |
| Example 47 | ◎ | ○ | | | | | | |
| Example 48 | ◎ | ○ | | | | | | |
| Example 49 | ◎ | ○ | | | | | | |
| Example 50 | ◎ | ○ | Δ | 37.4 | Δ | 432.0 | ○ | 143 |
| Example 51 | ◎ | ○ | Δ | 37.9 | Δ | 388.0 | ○ | 131 |
| Example 52 | ◎ | ○ | Δ | 38.7 | Δ | 308.0 | ○ | 104 |
| Example 53 | ◎ | ○ | Δ | 44.2 | Δ | 524.9 | ○ | 102 |
| Example 54 | ◎ | ○ | Δ | 41.9 | Δ | 452.0 | ○ | 126 |
| Example 55 | | | Δ | 42.3 | Δ | 569.7 | ○ | 200 |
| Example 56 | ◎ | ○ | Δ | 38.3 | Δ | 495.0 | ○ | 79 |
| Example 57 | ◎ | ○ | Δ | 39.2 | Δ | 413.4 | ○ | 62 |
| Example 58 | ◎ | ○ | Δ | 35.3 | Δ | 380.1 | ○ | 89 |
| Example 59 | ◎ | ○ | ○ | 28.0 | Δ | 334.7 | ○ | 83 |
| Example 60 | | | ○ | 25.5 | Δ | 387.5 | ○ | 88 |
| Example 61 | ◎ | ○ | ○ | 28.1 | ○ | 246.8 | ○ | 138 |
| Example 62 | | | ○ | 29.8 | Δ | 329.8 | ○ | 137 |
| Example 63 | | | ○ | 25.9 | Δ | 389.1 | ○ | 80 |
| Example 64 | | | ○ | 24.9 | ○ | 299.0 | ○ | 142 |
| Example 65 | | | Δ | 30.9 | Δ | 482.3 | ○ | 85 |
| Example 66 | | | Δ | 30.0 | Δ | 539.3 | ○ | 100 |
| Example 67 | | | ○ | 24.8 | ○ | 256.9 | ○ | 146 |
| Example 68 | | | Δ | 30.6 | Δ | 375.7 | ○ | 78 |
| Example 69 | | | Δ | 31.3 | Δ | 382.1 | ○ | 90 |
| Example 70 | | | Δ | 31.4 | Δ | 545.0 | ○ | 110 |
| Example 71 | ◎ | ○ | ○ | 19.3 | ○ | 195.7 | ○ | 90 |
| Example 72 | ◎ | ○ | ○ | 20.6 | ○ | 197.5 | ○ | 100 |
| Example 73 | ◎ | ○ | ○ | 19.6 | ○ | 215.2 | ○ | 105 |
| Comparative Example 10 | X | X | | | | | | |
| Comparative Example 11 | X | X | | | | | | |
| Comparative Example 12 | X | X | X | 45.0 | X | 611.0 | ○ | 68 |
| Comparative Example 13 | X | X | Δ | 40.2 | X | 618.2 | X | 52 |
| Comparative Example 14 | X | X | Δ | 30.9 | X | 727.6 | X | 44 |

TABLE 3

| | Combustion Test | | Cone Calorimeter Test | | | | | |
|---|---|---|---|---|---|---|---|---|
| | Ignition/ Carbonization/ Afterflame | Penetration/ Melt dripping | | Total Amount of Heat Generated ($MJ/m^2$) | | Maximum Heat Generation Rate ($kW/m^2$) | | Ignition Time (sec) |
| Example 2-11 | ◉ | ○ | ○ | 26.4 | ○ | 240 | ○ | 107 |
| Example 2-12 | ◉ | ○ | ○ | 5.7 | ○ | 92 | ○ | 180 |
| Example 2-13 | ◉ | ○ | ○ | 10.3 | ○ | 242 | ○ | 170 |
| Example 2-14 | ◉ | ○ | ○ | 24.0 | ○ | 258 | ○ | 67 |
| Example 2-15 | ◉ | ○ | ○ | 12.5 | ○ | 105 | ○ | 175 |
| Example 2-16 | ◉ | ○ | ○ | 17.3 | ○ | 222 | ○ | 180 |
| Example 2-17 | ◉ | ○ | ○ | 20.7 | ○ | 125 | ○ | 126 |
| Example 2-18 | ◉ | ○ | ○ | 19.0 | ○ | 187 | ○ | 150 |
| Example 2-19 | ◉ | ○ | ○ | 20.4 | ○ | 284 | ○ | 113 |
| Example 2-20 | ◉ | ○ | ○ | 11.0 | ○ | 149 | ○ | 145 |
| Example 2-21 | ◉ | ○ | ○ | 19.0 | Δ | 524 | ○ | 144 |
| Example 2-22 | ◉ | ○ | ○ | 21.3 | ○ | 193 | ○ | 140 |
| Example 2-23 | ◉ | ○ | ○ | 20.8 | ○ | 288 | ○ | 91 |
| Example 2-24 | ◉ | ○ | ○ | 15.7 | ○ | 264 | ○ | 92 |
| Comparative Example 2-1 | ◉ | ○ | Δ | 35.0 | Δ | 588 | X | 51 |

TABLE 4

| | Combustion Test | | Cone Calorimeter Test | | | | | |
|---|---|---|---|---|---|---|---|---|
| | Ignition/ Carbonization/ Afterflame | Penetration/ Melt dripping | | Total Amount of Heat Generated ($MJ/m^2$) | | Maximum Heat Generation Rate ($kW/m^2$) | | Ignition Time (sec) |
| Example 3-2 | ◉ | ○ | ○ | 17.0 | ○ | 117 | ○ | 102 |
| Example 3-3 | ◉ | ○ | ○ | 7.7 | ○ | 50 | ○ | 160 |
| Example 3-4 | ◉ | ○ | ○ | 8.2 | ○ | 62 | ○ | 166 |
| Example 3-5 | ◉ | ○ | ○ | 22.7 | ○ | 144 | ○ | 68 |
| Comparative Example 3-1 | X | Δ | ○ | 29.9 | ○ | 281 | X | 59 |
| Comparative Example 3-2 | X | Δ | Δ | 34.7 | Δ | 427 | ○ | 68 |
| Comparative Example 3-3 | X | ○ | Δ | 39.8 | Δ | 499 | X | 54 |
| Comparative Example 3-4 | X | Δ | Δ | 34.0 | ○ | 271 | X | 36 |

TABLE 5

| | Combustion Test | | Cone Calorimeter Test | | | | | | |
|---|---|---|---|---|---|---|---|---|---|
| | Ignition/ Carbonization/ Afterflame | Penetration/ Melt dripping | | Total Amount of Heat Generated ($MJ/m^2$) | | Maximum Heat Generation Rate ($kW/m^2$) | | Ignition Time (sec) | Scratch Resistance |
| Example 4-1 | ◉ | ○ | ○ | 20.1 | ○ | 248 | ○ | 115 | A |
| Example 4-2 | ◉ | ○ | ○ | 20.8 | ○ | 291 | ○ | 114 | A |

INDUSTRIAL APPLICABILITY

The flame-resistant composite member according to the present invention, since exhibiting remarkably high flame resistance even if having a flammable base material, is useful as illumination apparatuses, particularly illumination apparatuses requiring non-carbonization property, such as railway rolling stock applications.

REFERENCE SIGNS LIST

1 BASE MATERIAL
2 FILM (COATED LAYER)
3 FLAME-RESISTANT COMPOSITE MEMBER
11 TEST SPECIMEN
12 ALCOHOL VESSEL (FUEL VESSEL)
13 VESSEL RECEIVING PLATFORM
14 EXHAUST HOOD
15 CONE-TYPE HEATER
16 TEST SPECIMEN MATERIAL
17 TEST SPECIMEN MATERIAL HOLDER

The invention claimed is:
1. A flame-resistant composite member, having a film formed of a silicone resin composition (C) comprising at least an inorganic oxide particle-containing condensation-reactive silicone resin on at least one surface of a base material, wherein the flame-resistant composite member has a property of not igniting or carbonizing in a combustion test of a railway rolling stock material combustion test.

2. The flame-resistant composite member according to claim 1, wherein the inorganic oxide particle-containing condensation-reactive silicone resin is a condensation-reactive silicone resin (A) comprising a crosslinked structural body wherein in the crosslinked structural body, an inorganic oxide particle dispersed in a polysiloxane resin having a condensation-reactive group and the polysiloxane resin are crosslinked through a chemical bond.

3. The flame-resistant composite member according to claim 2, wherein in the condensation-reactive silicone resin (A), as the polysiloxane resin having a condensation-reactive group, (i) a condensation-reactive group-containing polysilsesquioxane wherein a basic structural unit thereof is a T unit, or (ii) the condensation-reactive group-containing polysilsesquioxane wherein a basic structural unit thereof is a T unit and also a condensation-reactive group-containing polysiloxane wherein basic structural units thereof are a D unit and a T unit and/or a polysiloxane resin having a silanol group are used.

4. The flame-resistant composite member according to claim 1, wherein the silicone resin composition (C) comprising at least an inorganic oxide particle-containing condensation-reactive silicone resin comprises: a condensation-reactive silicone resin (A) comprising a crosslinked structural body wherein in the crosslinked structural body, an inorganic oxide particle dispersed in a polysiloxane resin having a condensation-reactive group and the polysiloxane resin are crosslinked through a chemical bond; and an inorganic particle (B).

5. The flame-resistant composite member according to claim 4, wherein the inorganic particle (B) is at least one inorganic particle selected from the group consisting of glass frits, silica particles, alumina particles, aluminum hydroxide particles, magnesium hydroxide particles, tin oxide particles and clay mineral particles.

6. The flame-resistant composite member according to claim 5, wherein the glass frit as the inorganic particle (B) has a deformation point of not less than 300° C. and not more than 700° C.

7. The flame-resistant composite member according to claim 5, wherein the glass frit as the inorganic particle (B) is a glass frit formed of at least one component selected from silicic acid, boric acid, borosilicic acid, aluminum oxide, calcium oxide, sodium oxide, lithium oxide and phosphorus oxide.

8. The flame-resistant composite member according to claim 7, wherein the glass frit as the inorganic particle (B) is a glass frit formed of at least a component comprising phosphorus oxide.

9. The flame-resistant composite member according to claim 5, wherein the glass frit as the inorganic particle (B) has an average particle diameter of 0.1 µm to 1,000 µm.

10. The flame-resistant composite member according to claim 4, wherein the inorganic particle (B) has a content of 0.1 to 500 parts by weight with respect to 100 parts by weight of the condensation-reactive silicone resin (A).

11. The flame-resistant composite member according to claim 1, wherein the base material is a sheet-like or plate-like plastic-based base material.

12. The flame-resistant composite member according to claim 1, wherein the flame-resistant composite member has a thickness of 50 to 6,000 µm.

13. The flame-resistant composite member according to claim 1, wherein the film formed of the silicone resin composition (C) has a thickness of 5 to 1,000 µm.

14. The flame-resistant composite member according to claim 1, wherein the flame-resistant composite member exhibits a total amount of heat generated per 10 min of not more than 30 MJ/m$^2$, a maximum heat generation rate of not more than 300 kW/m$^2$, and an ignition time of not less than 60 sec, in a cone calorimeter test of a railway rolling stock material combustion test.

15. The flame-resistant composite member according to claim 1, being used as a transport machinery interior member, a building material member, a display member, a household appliance member or an electronic circuit member.

16. The flame-resistant composite member according to claim 15, wherein the transport machinery interior member is an illumination cover.

17. An illumination apparatus using a flame-resistant composite member according to claim 1, the illumination apparatus comprising, at least, a light source to generate light used for illumination, and an illumination cover installed so as to cover the light source and having the flame-resistant composite member, wherein light from the light source is transmitted through the flame-resistant composite member and emitted.

18. A flame-resistant composite member, having a film formed of a silicone resin composition (C) comprising at least an inorganic oxide particle-containing condensation-reactive silicone resin on at least one surface of a base material, wherein the inorganic oxide particle-containing condensation-reactive silicone resin is a condensation-reactive silicone resin (A) comprising a crosslinked structural body wherein in the crosslinked structural body, an inorganic oxide particle dispersed in a polysiloxane resin having a condensation-reactive group and the polysiloxane resin are crosslinked through a chemical bond.

19. A flame-resistant composite member, having a film formed of a silicone resin composition (C) comprising at least an inorganic oxide particle-containing condensation-reactive silicone resin on at least one surface of a base material, wherein the silicone resin composition (C) comprising at least an inorganic oxide particle-containing condensation-reactive silicone resin comprises: a condensation-reactive silicone resin (A) comprising a crosslinked structural body wherein in the crosslinked structural body, an inorganic oxide particle dispersed in a polysiloxane resin having a condensation-reactive group and the polysiloxane resin are crosslinked through a chemical bond; and an inorganic particle (B).

* * * * *